US009565956B1

(12) United States Patent
Mitchell et al.

(10) Patent No.: US 9,565,956 B1

(45) Date of Patent: Feb. 14, 2017

(54) SERVING BOARD

(71) Applicants: Jennifer L. Mitchell, Riverview, FL (US); Mary Mitchell, Tampa, FL (US)

(72) Inventors: Jennifer L. Mitchell, Riverview, FL (US); Mary Mitchell, Tampa, FL (US)

(*) Notice: Subject to any disclaimer, the term of this patent is extended or adjusted under 35 U.S.C. 154(b) by 0 days.

(21) Appl. No.: 14/850,443

(22) Filed: Sep. 10, 2015

Related U.S. Application Data

(60) Provisional application No. 62/048,995, filed on Sep. 11, 2014.

(51) Int. Cl.

| | |
|---|---|
| ***A47G 19/00*** | (2006.01) |
| ***A47G 19/02*** | (2006.01) |
| ***F21V 33/00*** | (2006.01) |
| ***H04R 1/02*** | (2006.01) |
| ***G06F 3/16*** | (2006.01) |
| ***B65D 65/46*** | (2006.01) |

(52) U.S. Cl.

CPC ........... *A47G 19/025* (2013.01); *B65D 65/466* (2013.01); *F21V 33/0036* (2013.01); *G06F 3/165* (2013.01); *H04R 1/028* (2013.01); *A47G 2200/08* (2013.01); *A47G 2200/143* (2013.01)

(58) Field of Classification Search

CPC ............ A47G 19/025; A47G 2200/143; A47G 2200/08; B65D 65/466; F21V 33/0036

See application file for complete search history.

(56) References Cited

U.S. PATENT DOCUMENTS

| | | | | |
|---|---|---|---|---|
| 3,798,806 A | | 3/1974 | Sanford | |
| 3,814,032 A | * | 6/1974 | McMains | A47G 19/00 108/101 |
| 4,801,478 A | | 1/1989 | Greenblatt | |
| 4,803,604 A | * | 2/1989 | Nichols | A47G 23/06 362/154 |
| 5,140,885 A | | 8/1992 | Trivizki et al. | |
| 5,582,478 A | * | 12/1996 | Ambrosino | A47G 19/26 312/284 |
| 5,736,659 A | * | 4/1998 | Kyle, Jr. | A47G 19/025 446/265 |
| 6,170,961 B1 | * | 1/2001 | Knoch | A47G 19/00 108/23 |
| 7,287,870 B1 | * | 10/2007 | Knoch | G09F 13/04 362/806 |
| 2005/0246928 A1 | | 11/2005 | Lee | |
| 2006/0158886 A1 | * | 7/2006 | Lee | A47G 19/025 362/318 |
| 2006/0215417 A1 | * | 9/2006 | Chen | A47G 23/06 362/555 |

(Continued)

*Primary Examiner* — Daniel Rohrhoff

(74) *Attorney, Agent, or Firm* — Frijouf, Rust & Pyle, P.A.

(57) ABSTRACT

A serving board is disclosed for supporting an edible product. The serving board comprises a first board defining a lower surface, an upper surface and a first edge. A second board defines a lower surface, an upper surface and a second edge. A spacing layer extends between the lower surface of the first board and the upper surface of the second board. The spacing layer distances the first board from the second board for defining a chamber. An integrated circuit is positioned in the chamber. An electrical power source is positioned in the chamber and electrically coupled to the integrated circuit. An output device electrically is coupled to the integrated circuit for producing a sensatory output. The first board, the second board and the spacing layer are constructed from a biodegradable material.

24 Claims, 20 Drawing Sheets

(56) References Cited

U.S. PATENT DOCUMENTS

| | | | | | |
|---|---|---|---|---|---|
| 2008/0241775 | A1* | 10/2008 | Piemontese | A47G 19/00 | 431/295 |
| 2009/0021956 | A1* | 1/2009 | Grobler | A47F 11/10 | 362/554 |
| 2011/0067547 | A1* | 3/2011 | Willis | A21D 13/0087 | 84/94.2 |
| 2014/0224798 | A1* | 8/2014 | Johnson | A47G 19/26 | 220/212 |
| 2016/0025326 | A1* | 1/2016 | Gonchar | A47G 19/025 | 362/127 |

* cited by examiner

SERVING BOARD

CROSS-REFERENCE TO RELATED APPLICATIONS

This application claims benefit of U.S. Patent Provisional application Ser. No. 62/048,995 filed Sep. 11, 2014. All subject matter set forth in provisional application Ser. No. 62/048,995 is hereby incorporated by reference into the present application as if fully set forth herein.

BACKGROUND OF THE INVENTION

Field of the Invention

This invention relates to boards and more particularly to a serving board for supporting an edible product.

Background of the Invention

It has become a widely accepted western civilization practice to celebrate any important occasion with a celebration cake. Additionally, singing of festive songs associated with the event, such as the singing of birthday songs, and the adding of lit candles atop a birthday cake has become part of tradition. All of these celebratory elements date back through history to the Roman civilization and in fact fire, and lighted tapers or candles have had a special significance in early pagan rituals.

Modern celebrations generally include icing covered cake with various decorations, commensurate with the event. In order to provide a more festive and decorative atmosphere, more elaborate decorations including sound or music producing devices as well as elaborate lighting configurations have been included in the cake trays, plates or stands. Some of these trays, stands and plates have evolved into fairly complex devices having power supplies, audio, and lighting systems to entertain the celebrants. The complexity of these devices may produce logistics problems since they are required to be returned to their owner and cleaned prior to their next use.

There have been many in the prior art who have attempted to solve these problems with varying degrees of success. None, however completely satisfies the requirements for a complete solution to the aforestated problem. The following U.S. Patents are attempts of the prior art to solve this problem.

U.S. Pat. No. 3,798,806 to Sanford discloses a musical greeting card formed from a unitary member having a natural hinge for closing and opening the card. A back cover carries a music box or like element and a front cover carries a resiliency mounted decorative member. The card is maintained closed by communication between the front and back covers in interference fit relation. Upon separating the covers to open the card the music box element is actuated and the decorative member is arranged to pop-up, whereupon the member and a suitable greeting on the bottom of the box are exposed to a viewer.

U.S. Pat. No. 4,801,4787 to Greenblatt discloses a decorative notion or ornament for special occasions of purposes providing both an identifiable theme and melody associated with an occasion to be celebrated or purpose to be noted. Comprising the ornament is a figurine or other identifiable theme constructed with a simulated appearance (if appropriate) long associated with a special purpose occasion or purpose. Assembled plastic sections are interfitted to form an enclosure defining an internal cavity in which a battery operated melody module is contained. The melody module includes a microchip that has been preprogrammed to play a selected melody normally associated with the identifiable theme while a suitable switch is available to actuate, prolong or discontinue playing of the melody.

U.S. Pat. No. 4,803,604 to Nichols, et al. discloses an illuminated tray for use in darkened restaurants or nightclubs. The tray has a tray housing with a peripheral rim and a flat serving surface recessed within the rim. Spaced apart LEDs are positioned on the tray rim such that the light from the LEDs, when illuminated, is visible from both above and below the tray. Spaced apart batteries for energizing the LEDs are contained within the tray housing and are positioned in a manner that is substantially symmetric with respect to the center of the tray. The tray is thus balanced along any diameter U.S. Pat. No. 5,140,885 to Trivizki, et al. discloses a serving plate having a base body in which an integrated battery operated musical box is incorporated. The musical box is connected with two electrical leads which are printed on the plate, such that contact is established by a knife when cutting a food product on the plate between the leads.

U.S. Pat. No. 5,582,478 to Ambrosino discloses a food covering system resembling a decorated cake including a cover with receptacles for holding and providing power to illuminating decorations and/or moving decorations, including electronic candles. In response to a breath sensor sensing a predetermined level of air movement, power to the electronic candles is turned off and secondary illuminating decorations, such as letters arranged in a birthday message, are turned on. In addition to the secondary decorations, music or other sounds may be issued from a speaker embedded in the food cover. The secondary decorations and/or music may be turned on for a predetermined time. Alternatively, the secondary decorations and/or music are on with the electronic candles and remain on, after the candles are "blown out", for a predetermined time.

U.S. Pat. No. 5,436,659 to Kyle, Jr. discloses a rotating musical serving plate with a serving plate removably attached thereto. A support has a base which is securely attached to a lower distal end of a pedestal. The upper distal end of the pedestal is securely attached to a bearing ring having a plurality of bearing retainers functioning to rotatably restrain a plurality of bearings. A drive has plurality of mounting lugs securely attached around an outside lower distal portion of a perimeter of a drive housing. The drive is securely attached to the base by a plurality of mounting lugs by a fastener. An upper distal end of the drive housing is securely attached to a drive cover. The drive cover at a central portion is securely attached to a drive spindle bearing. The serving plate spindle socket cooperates with a drive fluted adapter to securely removably attach the serving plate spindle socket thereto. An audio device has a case which is securely attached to the base by a fastener. The case has an ON/OFF switch which functions to control the audio device. The case further has a speaker which functions to transmit acoustical energy, the audio device functions to emit speech, music and other sounds appropriate to the product displayed on the serving plate.

U.S. Pat. No. 6,170,961 to Knoch discloses a wedding cake layer highlighted by a transparent plastic light assembly illuminated by a string of miniature electric lights. The light assembly supports a cake on a transparent plastic tray in an elevated position. The light assembly has one or more transparent plastic tubes forming pillars which are affixed between a top plate and a bottom plate. The plates have pillar entry holes such that a looped strand of lights may pass from the underside of the bottom plate to the top side of the top plate and be affixed thereto. The cake tray has downwardly extending feet which are received within cylindrical protrusions on the top plate. The cake tray has a peripheral rim through which the illuminated miniature lights are visible. An inverted cake tray is positioned beneath the bottom plate such that the feet of the inverted tray engage downwardly extending protrusions on the bottom plate. An electric cord extends from the lighted stand between the bottom plate and the inverted cake tray to be connected to another similar cake support or to an extension cord for connection to a power supply. The inverted tray may be disposed on a tabletop or on an underlying cake layer.

U.S. Pat. No. 7,287,870 to Knoch discloses an illuminated display system or assembly. In particular, the illuminated system is designed to display various food items such as wedding cakes, hors d'oeuvres, buffets, pies, and the like. The assembly includes a plurality of plates and sheets adapted to be engaged to form enclosures for lighting. Lighting is secured to the sheets within the enclosures. The assembly further includes one or more pillars each adapted to engage the plates and to house additional lighting. The invention also includes methods of assembling the display system and methods of displaying and illuminating the various food items.

United States Patent Application 2005/0246928 to Lee discloses an illuminating display device adapted for enhancing amusement for a recipient thereof. More particularly, the device includes a portable case having at least one compartment. The device also includes at least one illuminating source received in the compartment. A stencil is attached to the case for permitting light emitted from the illuminating source to be transmitted therethrough in a predetermined pattern. The device is equipped with a dispersion layer for dispersing light emitted from the illuminating source.

United States Patent Application 2011/0067547 to Willis discloses a musical recording and playback device comprising: a flexible plastic bag enclosure serving as a isolator. An electronic integrated circuit is included for storing a pre-programmed recorded message, and at least one speaker is provided for audibly emitting the pre-programmed recorded message to at least one honored recipient. A portable DC power source with a start button acting as an on/off switch is provided for turning the device on to play a message and/or song. The flexible enclosure isolatably contains the generally planar electronic integrated circuit, the speaker, and the portable DC power source assembly. The musical recording and playback device is associated with a festive cake comestible. A kit for use with the cake and method of use is also disclosed herein.

Although the aforementioned prior art have contributed to the development of the art of celebratory cake trays none of these prior art patents have solved the needs of this art.

Therefore, it is an object of the present invention to provide an improved serving board for edible products.

Another object of this invention is to provide an improved serving board that is disposable upon completion of use.

Another object of this invention is to provide an improved serving board that is easy to cost effectively produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved serving board for supporting an edible product. The serving board comprises a first board defining a lower surface, an upper surface and a first edge. A second board defines a lower surface, an upper surface and a second edge. A spacing layer extends between the lower surface of the first board and the upper surface of the second board. The spacing layer distances the first board from the second board for defining a chamber. An integrated circuit is positioned in the chamber. An electrical power source is positioned in the chamber and electrically coupled to the integrated circuit. An output device electrically is coupled to the integrated circuit for producing a sensatory output. The first board, the second board and the spacing layer are constructed from a biodegradable material.

In a more specific embodiment of the invention, the output device includes a speaker and the sensatory output includes an audible sound. An actuator electrically is coupled to the integrated circuit. The actuator is engaged for recording and saving a personal message within the integrated circuit. The personal message defines the audible sound upon engaging the actuator.

In one embodiment of the invention, the output device includes an illuminating device and the sensatory output includes a viewable light. The illuminating device includes a plurality of light emitting diodes secured to the first board and projecting the viewable light in a generally ascending and vertical orientation above the upper surface of the first board.

In another embodiment of the invention, the serving board comprises a lower board defining a lower fluted corrugated medium between a lower liner board and an upper liner board. The lower board defines a lower edge. An upper board defines an upper fluted corrugated medium between a lower liner board and an upper liner board. The upper board defines an upper edge. A middle board defines a middle fluted corrugated medium between a lower liner board and an upper liner board. The middle board defines a middle edge. A first adhesive couples the upper liner board of the lower board with the lower liner board of the middle board. A second adhesive couples the upper liner board of the middle board with the lower liner board of the upper board. A circuit aperture is in the middle board for defining a circuit board chamber between the lower board and the upper board. An integrated circuit is positioned within the circuit board chamber. An output device is electrically coupled to the integrated circuit for producing a sensatory output. The lower liner board, the upper liner board and the middle fluted corrugated medium are constructed from a biodegradable material.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
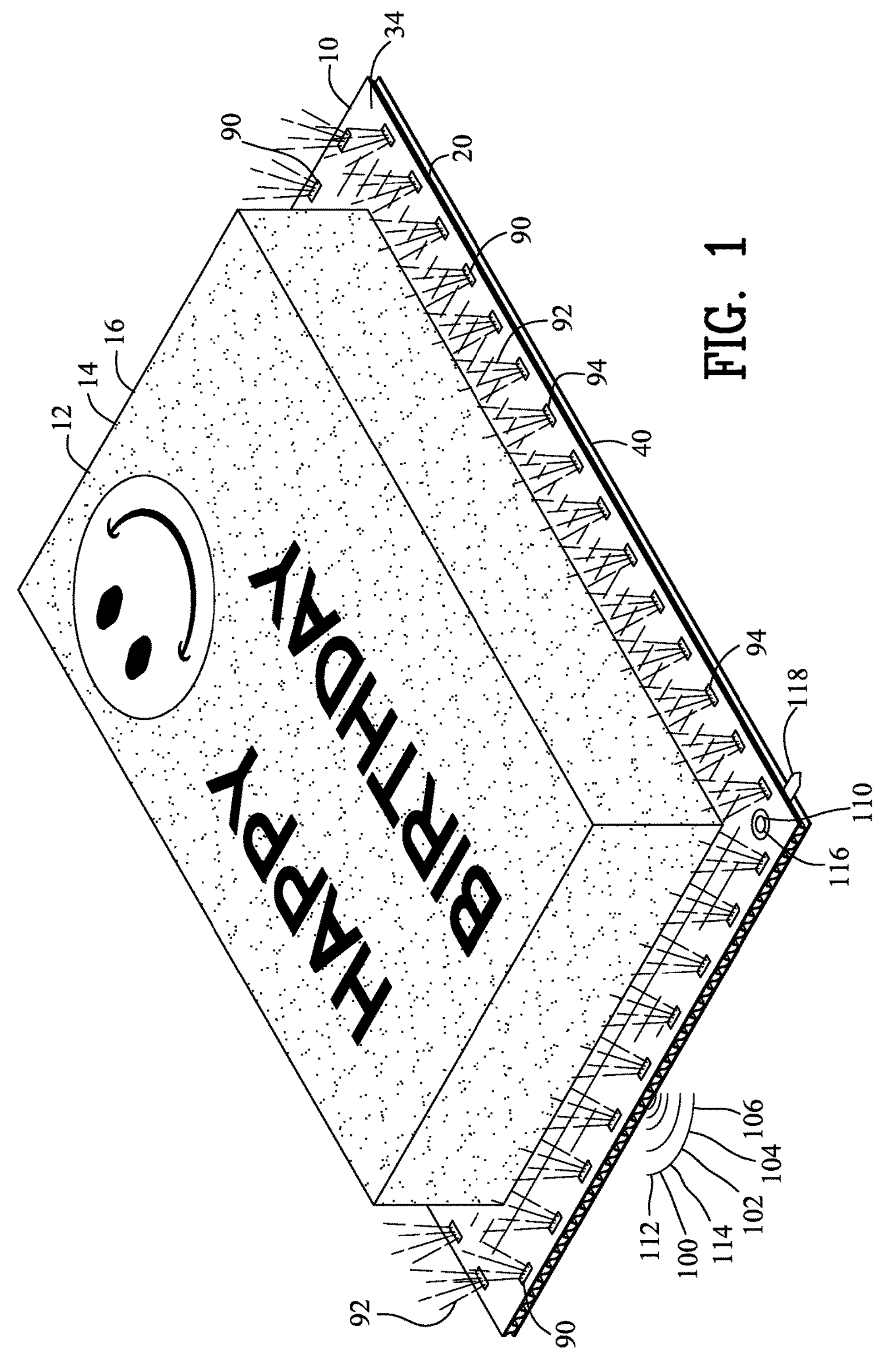
FIG. 1 is an upper front isometric view of a rectangular biodegradable serving board supporting an edible product namely a cake.
Figure 2:
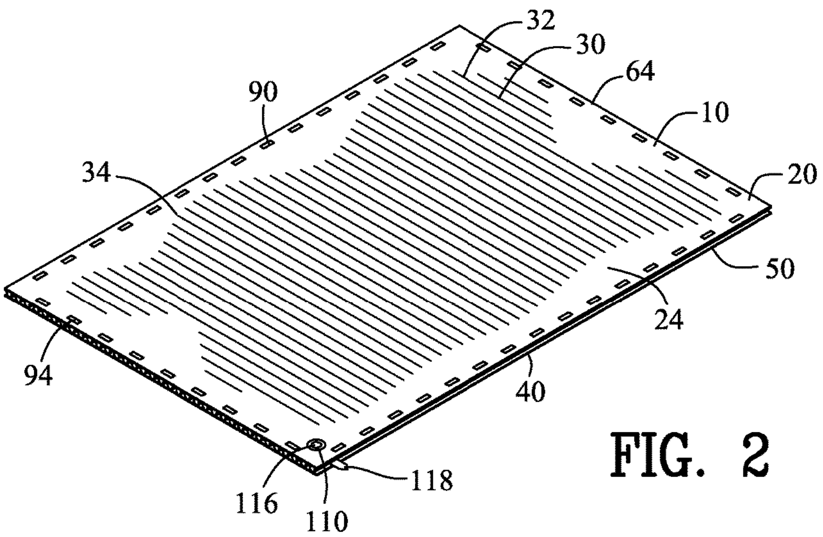
FIG. 2 is a view similar to FIG. 1 illustrating the serving board without supporting the edible product.
Figure 3:
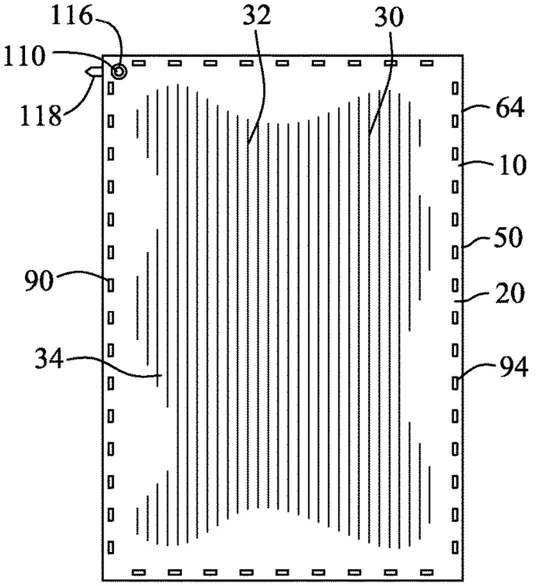
FIG. 3 is a top view of FIG. 2.
Figure 5:
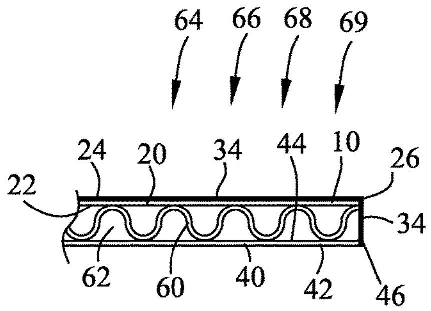
FIG. 5 is an enlarged portion of FIG. 4 illustrating a first board, a second board and a spacing layer between the first board and the second board.
Figure 4:
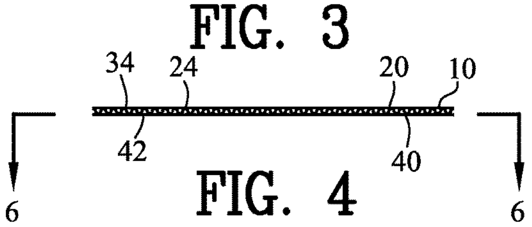
FIG. 4 is a side view of FIG. 3.

FIGS. 1-23 illustrate a serving board 10 for supporting a product 12. The product 12 is shown in FIGS. 1, 7, 13 and 19 to include a tenable product 14 namely a cake 16. Alternatively, the edible product 12 may include other edible products 12 including but not limited to pies, pastries, fruits, vegetables, meat products, dairy products, bread products, or other edible products. The product 12 is alternatively include one or more non-edible products. The serving board 10 includes a first board 20 having a lower surface 22, an upper surface 24 and a first edge 26. A second board 40 includes a lower surface 42, an upper surface 44 and a second edge 46.

A spacing layer 60 extending between the lower surface 22 of the first board 20 and the upper surface 44 of the second board 40. The spacing layer 60 distancing the first board 20 from the second board 40 for defining a chamber 62. As shown best in FIGS. 5, 11, 18 and 21-23, the spacing layer 60 may form a corrugated pattern 64.

Preferably, the first board 20, the second board 40 and the spacing layer 60 are constructed from a biodegradable material 64. The biodegradable material 64 may include paper pulp based material 66. The first board 20, the second board 40 and the spacing layer 60 may include a panel of corrugated fiberboard 68 or corrugated cardboard 69 constructed from a heavy paper pulp based material. Since the serving board 10 is contracted from a biodegradable material 64, the serving board 10 may be recyclable. The serving board 10 may be formed in any geometric shape. By way of example, FIGS. 1-6 illustrate the serving board 10 having a rectangular shape 50. FIGS. 7-23 illustrate the serving board 10 having a circular shape 52.

Figure 6:
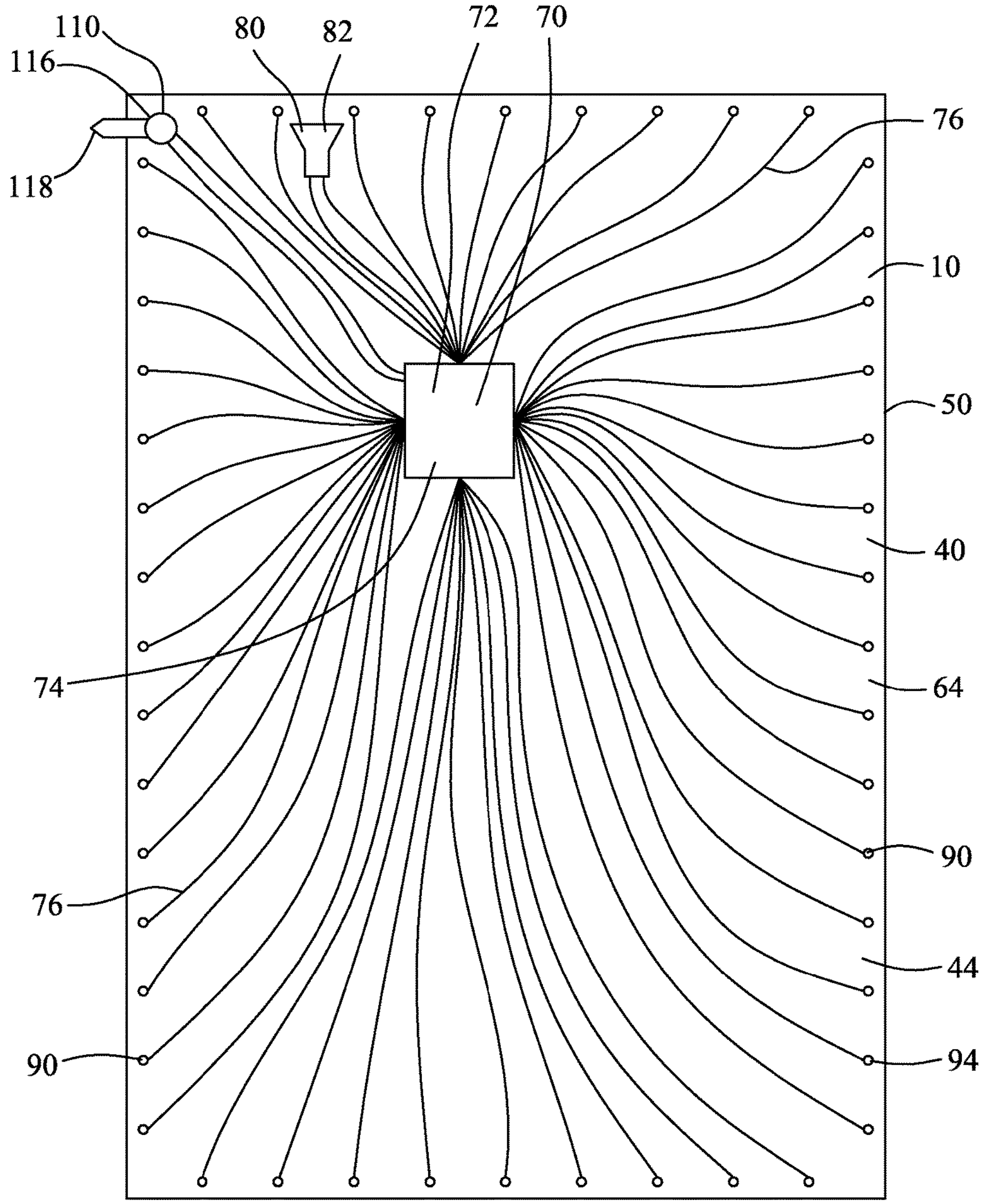
FIG. 6 is a sectional view along 6-6 in FIG. 4.
Figure 7:
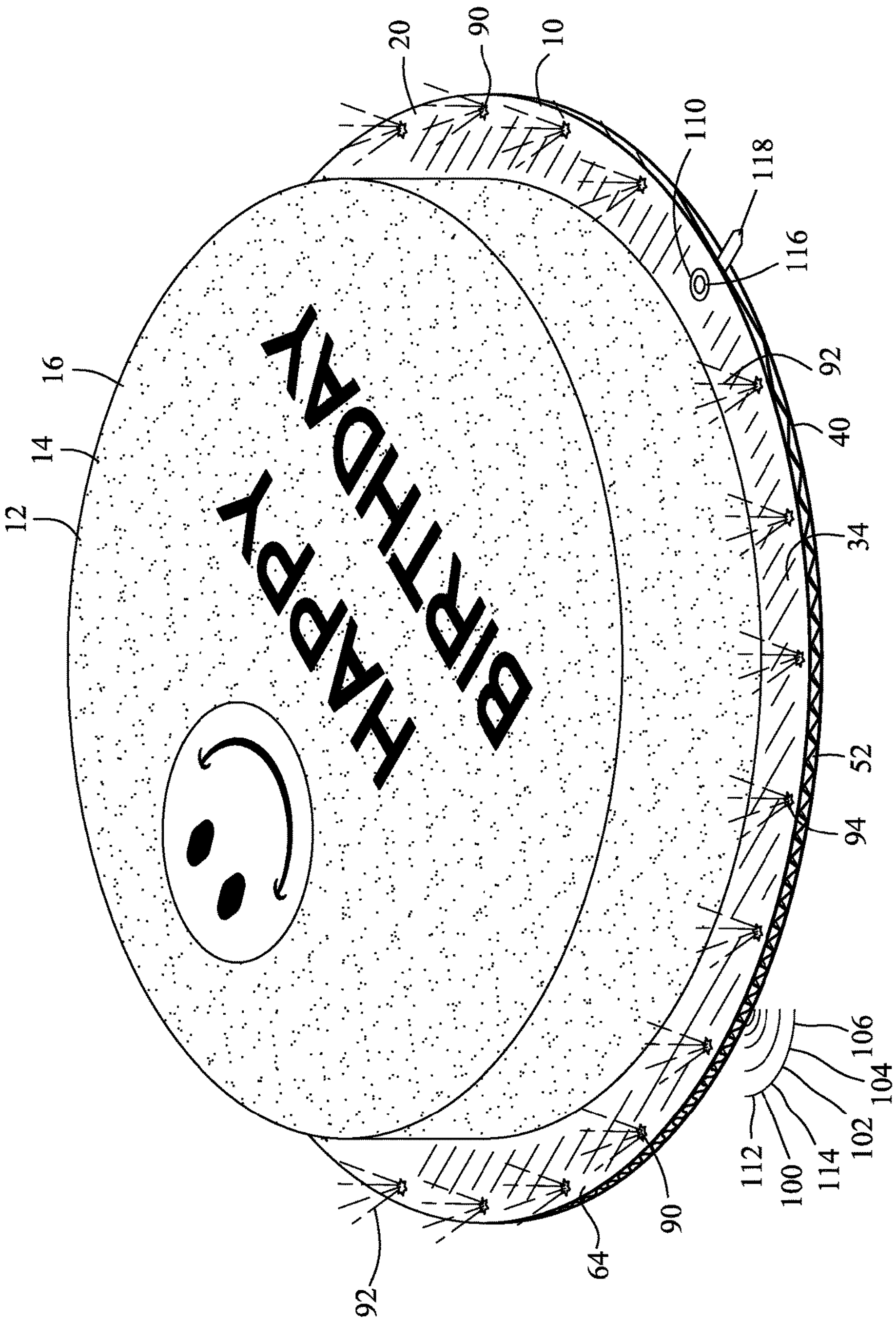
FIG. 7 is an upper front isometric view of a circular biodegradable serving board supporting an edible product namely a cake.
Figure 8:
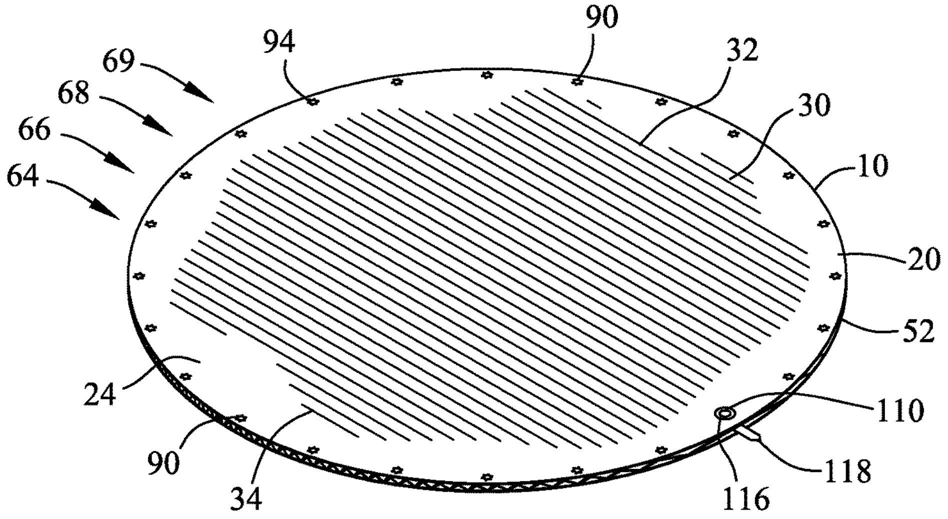
FIG. 8 is a view similar to FIG. 7 illustrating the serving board without supporting the edible product.
Figure 9:
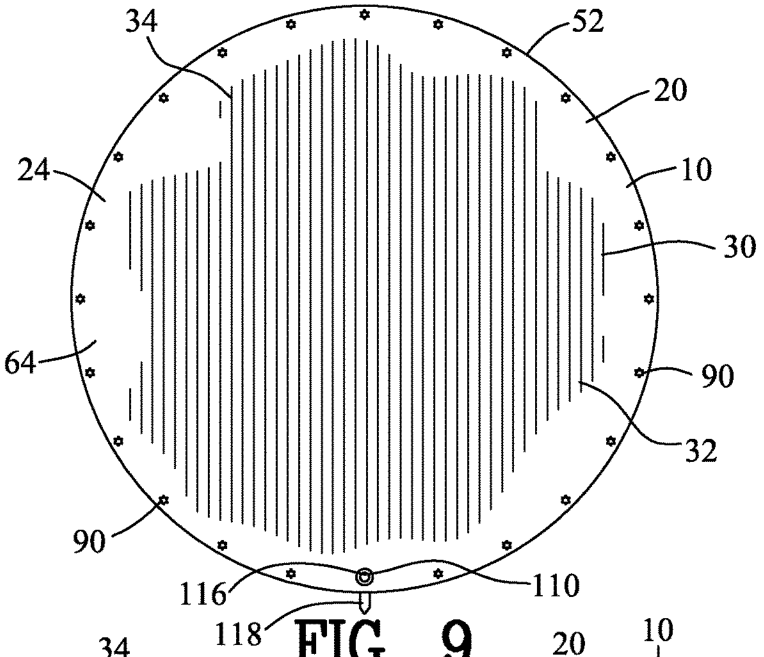
FIG. 9 is a top view of FIG. 8.
Figure 10:
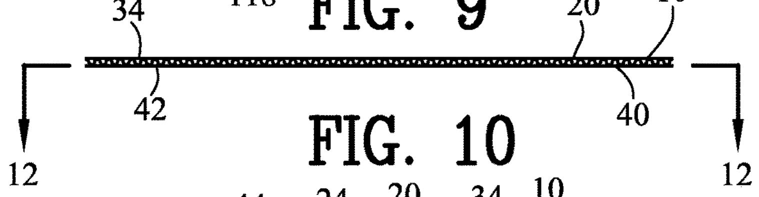
FIG. 10 is a side view of FIG. 9.
Figure 11:
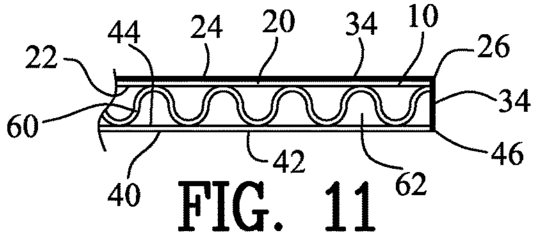
FIG. 11 is an enlarged portion of FIG. 10 illustrating a first board, a second board and a spacing layer between the first board and the second board.
Figure 12:
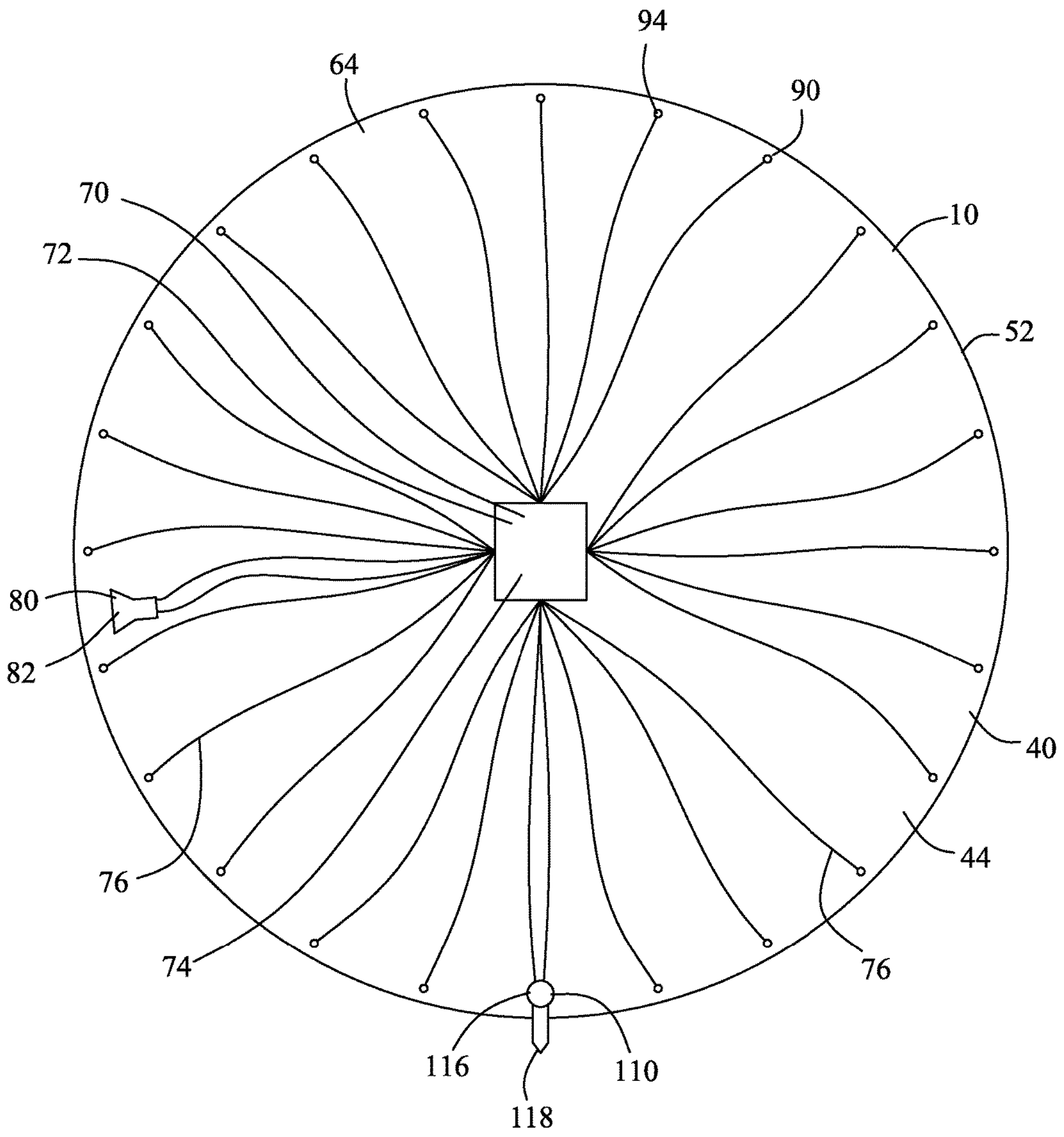
FIG. 12 is a sectional view along 12-12 in FIG. 10.

As shown in FIGS. 6 and 12, an integrated circuit 70 is positioned in the chamber 62. An electrical power source 80 is positioned in the chamber 62 and is electrically coupled to the integrated circuit 70. Preferably, the electrical power source 80 includes a battery 74 that is positioned within the integrated circuit 70.

An output device 80 is electrically coupled to the integrated circuit 70 for producing a sensatory output 100. The output device 80 may include a speaker 82 and the sensatory output may include an audible sound 102. The audible sound 102 may include a prerecorded musical composition 104 saved within the integrated circuit 70. Alternatively, the audible sound 102 may include a prerecorded message 106 saved within the integrated circuit 70.

In another embodiment of the subject invention, an actuator 110 may be electrically coupled to the integrated circuit 70. The actuator 110 is engaged for recording and saving a personal message 112 and or musical composition 114 within the integrated circuit 70. Thereafter, the actuator 110 may again be engaged for replaying the personal message 112 and or musical composition 114 for defining the audible sound 102. The actuator 110 may include a pushbutton 116 that is positioned within the first board 20. Alternatively, the actuator 110 may include a switch, light sensor or pull tab 118.

The output device 80 may alternatively or in addition to the speaker 82 include an illuminating device 90 wherein the sensatory output 100 includes a viewable light 92. The illuminating device 90 may include a plurality of light emitting diodes 94 secured to the first board 20 and projecting the viewable light 92 in a generally ascending and vertical orientation above the upper surface 24 of the first board 20. The plurality of light emitting diodes 94 may project multiple colors and may be illuminated in different time sequences and different patterns. Preferably, the plurality of light emitting diodes 94 are positioned adjacent to the first edge 26 of the first board 20 permitting sufficient area for placing the product 12 onto the first board 20.

The integrated circuit 70, electrical power source 72, the output device 80 and the maybe electrically coupled by one or more electrical conduits 76. The upper surface 24 of the first board 20 may include a decorative color 30 and or a decorative pattern 32. A wax layer 34 may cover the upper surface 24 of the first board 20 for sealing the product 12 from the first board 20.

Figure 13:
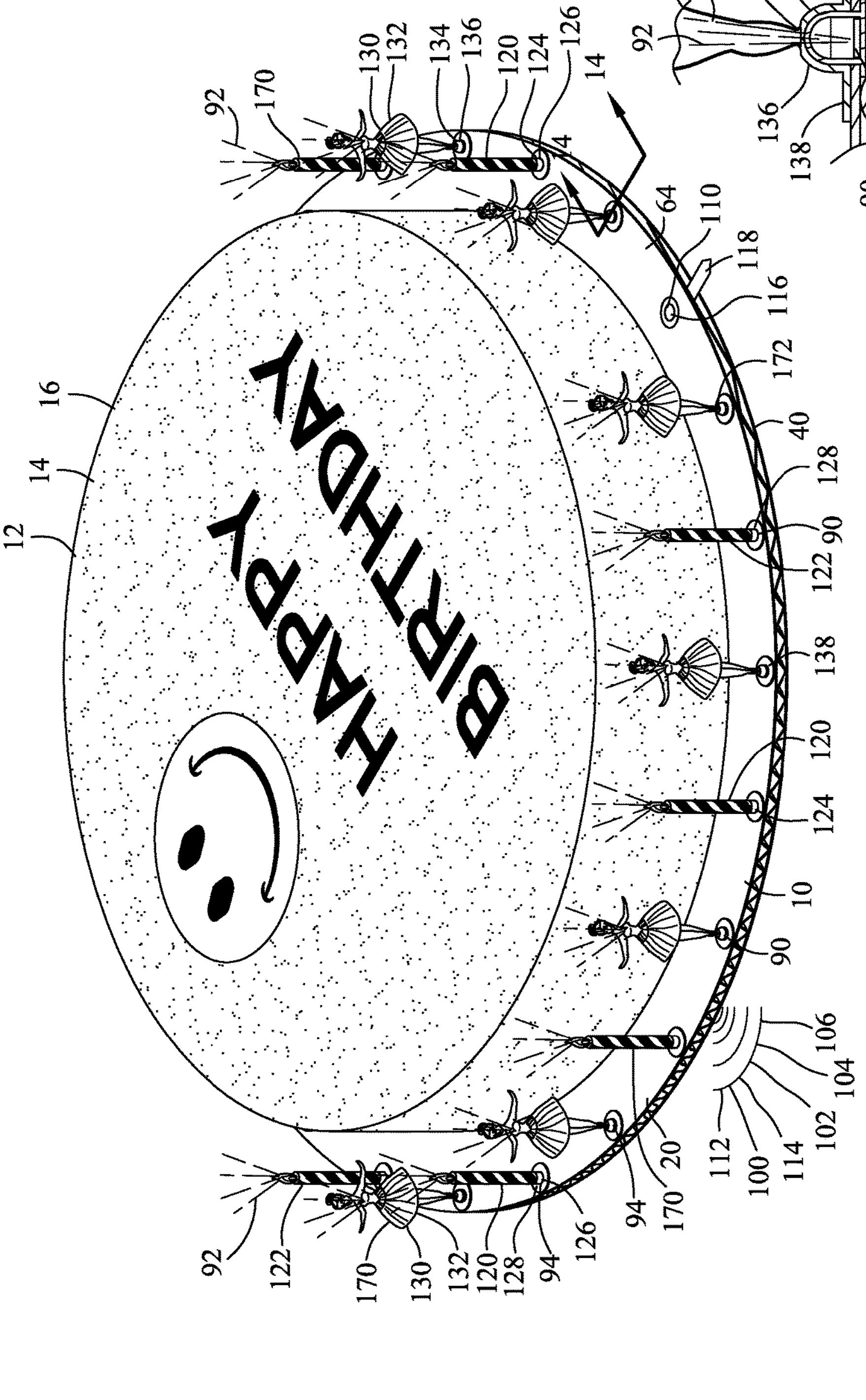
FIG. 13 is a view similar to FIG. 7 illustrating a plurality of light dispersing candles and a plurality of light dispersing ornaments coupled to the first board and covering the plurality of light emitting diodes for projecting the viewable light.
Figure 14:
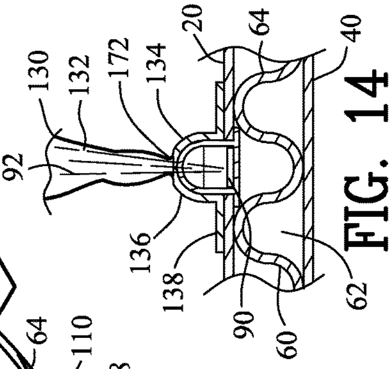
FIG. 14 is a sectional view along 14-14 in FIG. 13.
Figure 15:
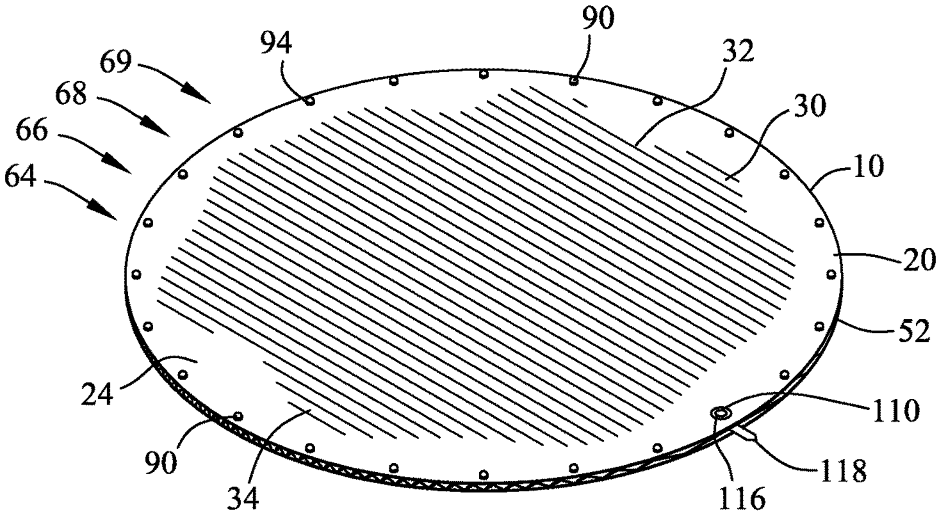
FIG. 15 is a view similar to FIG. 13 illustrating the serving board without supporting the edible product.
Figure 16:
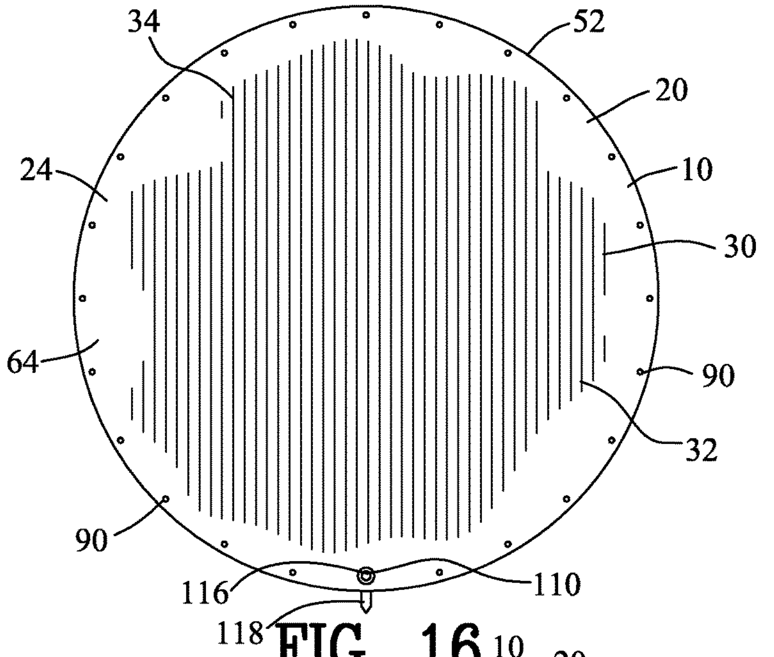
FIG. 16 is a top view of FIG. 15.
Figure 17:
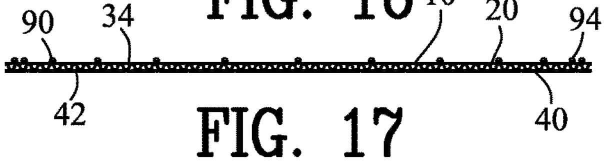
FIG. 17 is a side view of FIG. 16.
Figure 18:
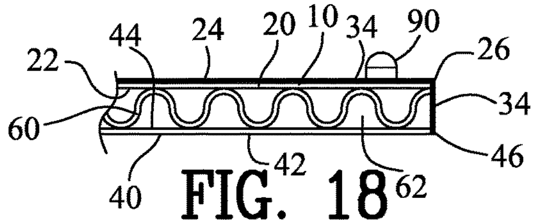
FIG. 18 is an enlarged portion of FIG. 17 illustrating a first board, a second board and a spacing layer between the first board and the second board wherein the light emitting diodes include a dome for receiving the plurality of light dispersing candles and a plurality of light dispersing ornaments.
Figure 19:
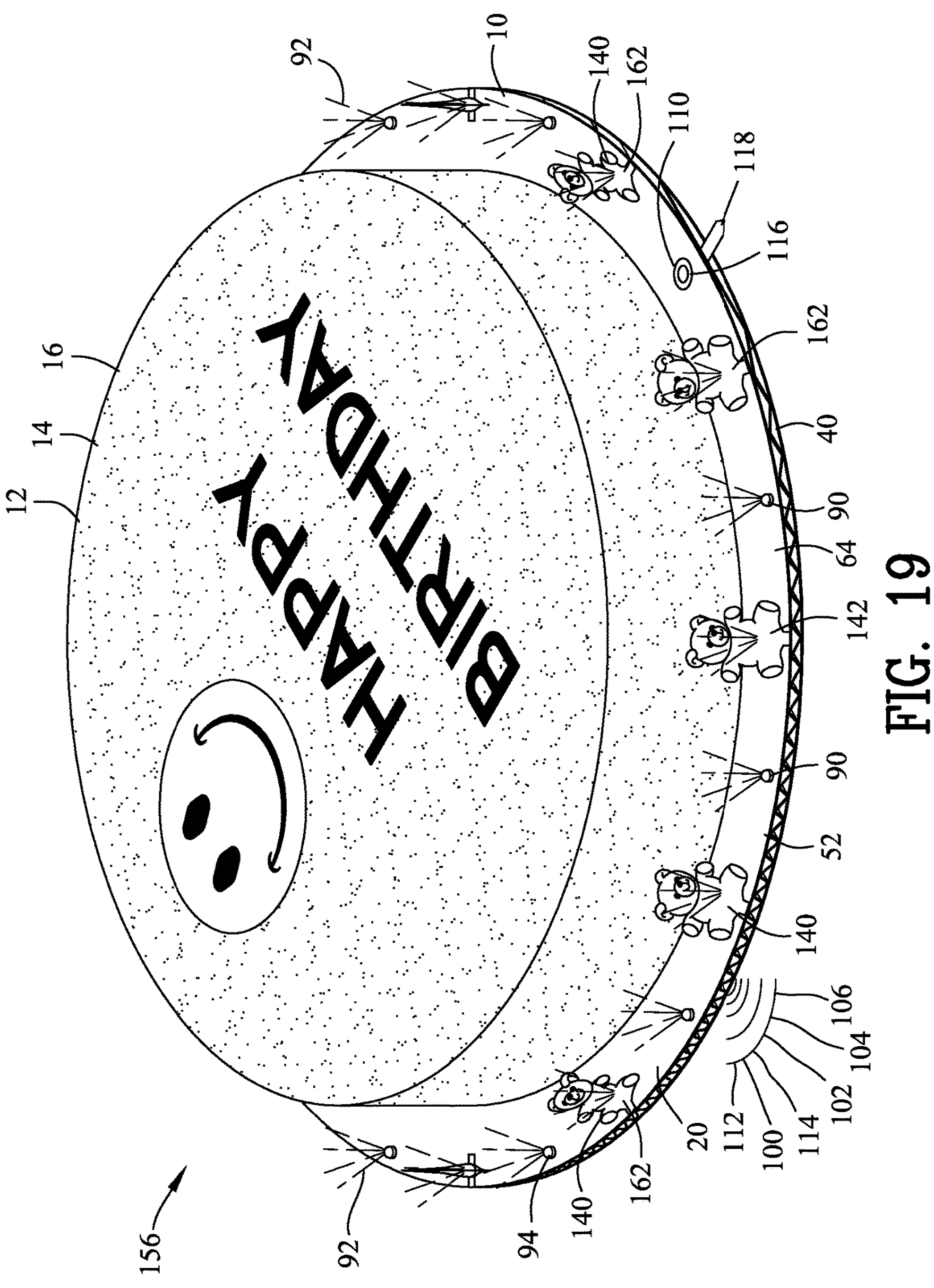
FIG. 19 is a view similar to FIG. 13 illustrating a plurality of biodegradable pivoting ornaments coupled to the first board and covering the plurality of light emitting diodes for projecting the viewable light.

As best shown in FIGS. 13 and 14, the present invention may further include a light dispersing candle 120 coupled to the upper surface 24 of the first board 20. The light dispersing candle 120 covers the light emitting diode 94 for projecting the viewable light 92 into the light dispersing candle 120. The light dispersing candle 120 includes a disbursing body 122 and a base 124. The disbursing body 122 disperses the viewable light 92 in multiple directions for illuminating the light dispersing candle 120. The base 124 includes a bulbous portion 126 and a linear portion 128. Preferably, the bulbous portion 126 has a curvature that is identical to the curvature of the light emitting diode 94 for continuously abutting the bulbous portion 126 with the light emitting diode 94. Similarly, the linear portion 128 continuously abuts the upper surface 24 of the first board 20. The continuous abutment between the base 124 with the light amending diode 94 and the upper surface 24 of the first board 20 provides a stable and removable coupling between the light dispersing candle 120 and the serving board 10. The light dispersing candle 120 is may be constructed from a biodegradable material 64.

Alternatively, the light dispensing candle 120 may be constructed of a second edible product 170 such as convection sugar or other products that may be consumed by an individual. The second edible product 170 could be removed by an individual as an additional treat to the edible product 14. Furthermore, the disbursing body 122 of the second edible product 170 may be separated from the base 124 of the second edible product 170 by an etched fracture line 172 for more easily separating the disbursing body 122 from the base 124. The etched fracture line 172 permits a more easy separation of the disbursing body 122 from the base 124 and creating a more decorative figure to consume for the individual.

Also shown in FIGS. 13 and 14, the present invention may further include a light dispersing ornament 130 coupled to the upper surface 24 of the first board 20. The light dispensing ornament 130 may include but not limited to figurines, symbols, models, letters, numbers, designs or other ornamental objects. The light dispersing ornament 130 covers the light emitting diode 94 for projecting the viewable light 92 into the light dispersing ornament 130. The light dispersing ornament 130 includes a disbursing body 132 and a base 134. The disbursing body 132 disperses the viewable light 92 in multiple directions for illuminating the light dispersing ornament 130. The base 134 includes a bulbous portion 136 and a linear portion 138. Preferably, the bulbous portion 136 has a curvature that is identical to the curvature of the light emitting diode 94 for continuously abutting the bulbous portion 136 with the light emitting diode 94. Similarly, the linear portion 138 continuously abuts the upper surface 24 of the first board 20. The continuous abutment between the base 134 with the light amending diode 94 and the upper surface 24 of the first board 20 provides a stable and removable coupling between the light dispersing ornament 130 and the serving board 10. The light dispersing ornament 130 is may be constructed from a biodegradable material 64.

Alternatively, the light dispersing ornament 130 may be constructed of a second edible product 170 such as convection sugar or other products that may be consumed by an individual. The second edible product 170 could be removed by an individual as an additional treat to the edible product 14. Furthermore, the disbursing body 122 of the second edible product 170 may be separated from the base 124 of the second edible product 170 by an etched fracture line 172 for more easily separating the disbursing body 122 from the base 124. The etched fracture line 172 permits a more easy separation of the disbursing body 122 from the base 124 and creating a more decorative figure to consume for the individual.

Figure 20:
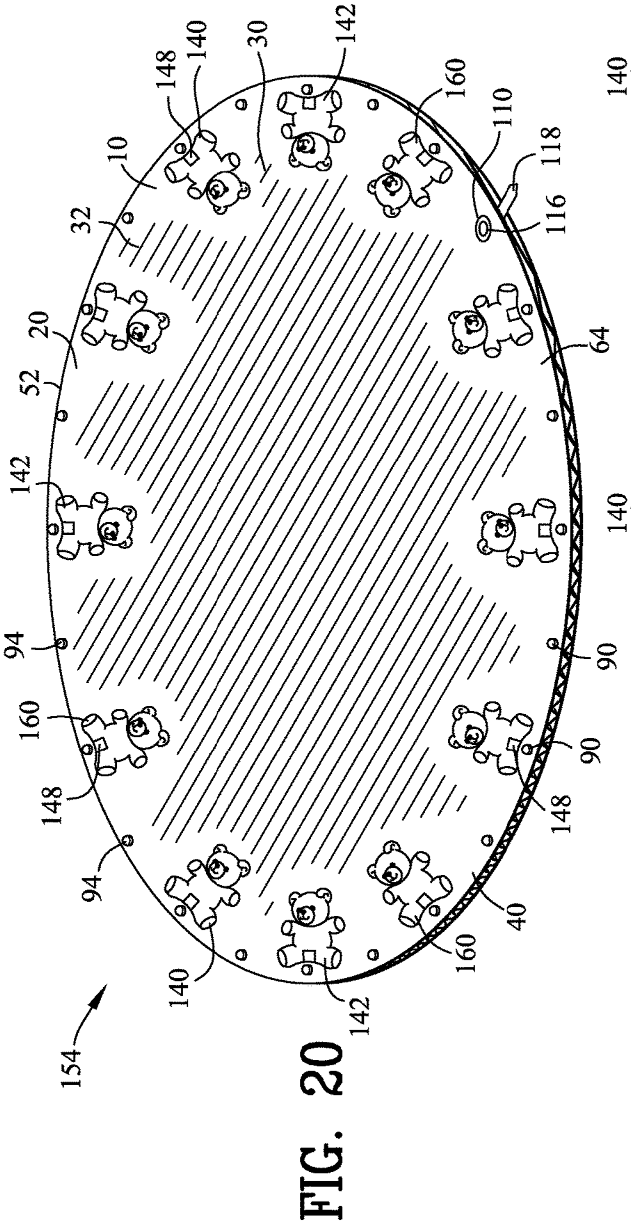
FIG. 20 is a view similar to FIG. 19 illustrating the serving board without supporting the edible product and where the plurality of biodegradable pivoting ornaments are in a collapsible position.
Figure 21:
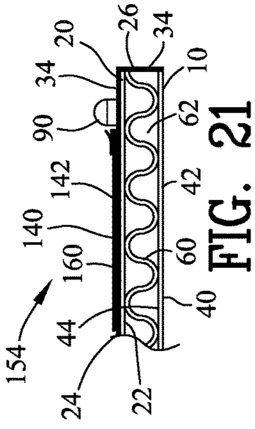
FIG. 21 is an enlarged side view of FIG. 20.
Figure 22:
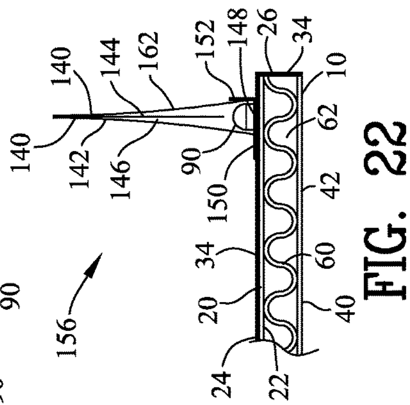
FIG. 22 is a view similar to FIG. 21 illustrating the biodegradable pivoting ornament pivoted into the expandable position over the light emitting diode.
Figure 23:
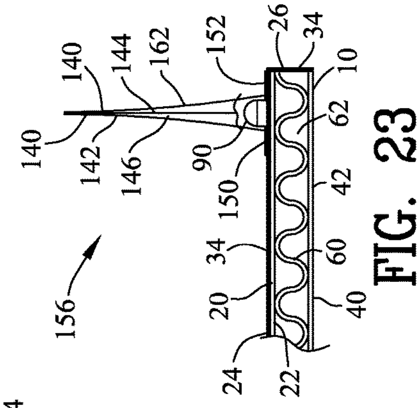
FIG. 23 is a view similar to FIG. 22 illustrating a locking leg of the biodegradable pivoting ornament coupling to the first board for maintaining the biodegradable pivoting ornament in a perpendicular orientation relative to the first board during utilization of the serving board.
Figure 24:
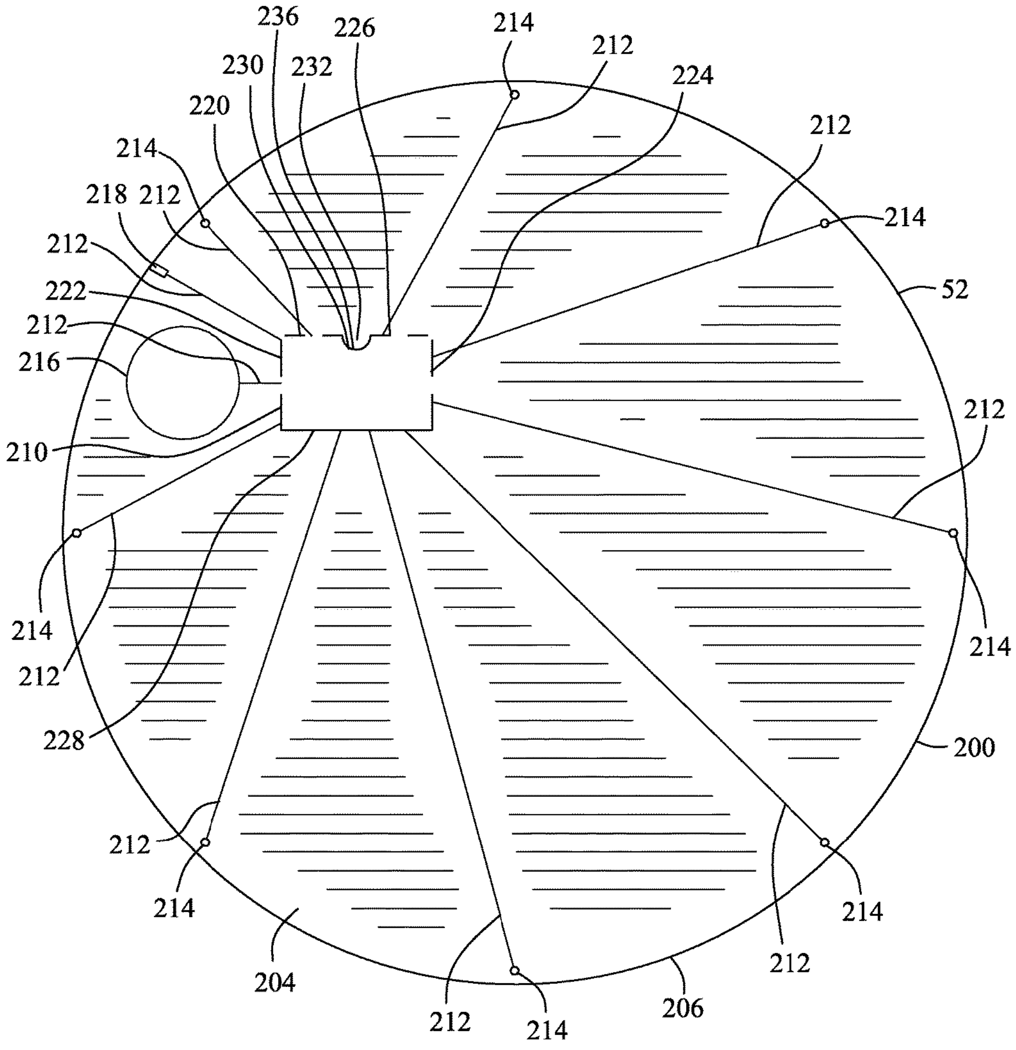
FIG. 24 is a top view of a lower board included in a second embodiment of a biodegradable serving board supporting an edible product.
Figure 25:
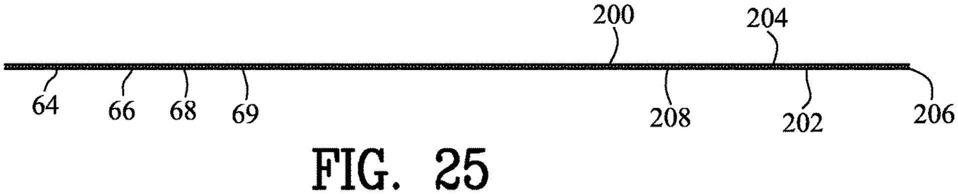
FIG. 25 is a side view of FIG. 24.
Figure 26:
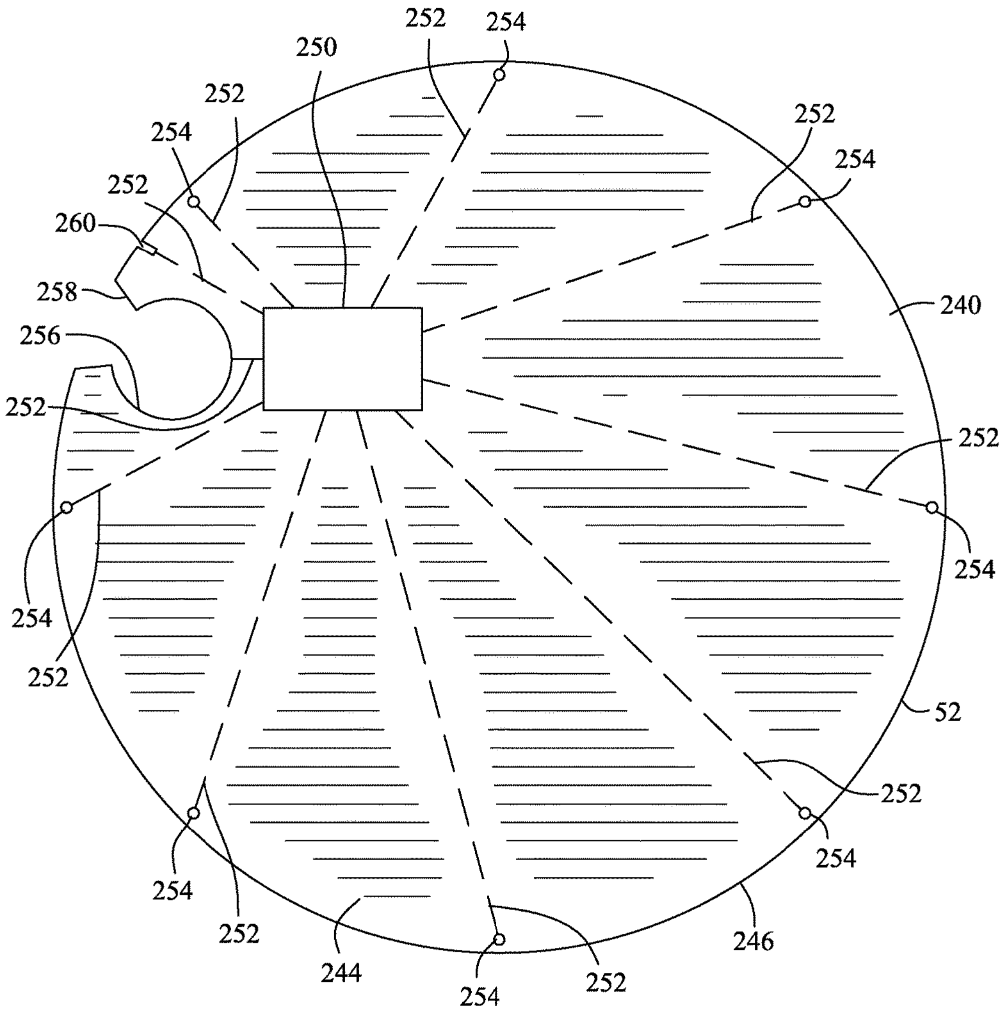
FIG. 26 is a top view of a middle board included in the second embodiment of a biodegradable serving board supporting an edible product.
Figure 27:
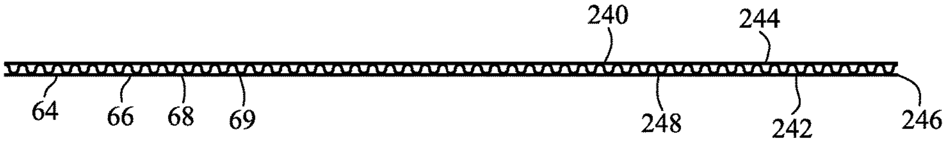
FIG. 27 is a side view of FIG. 26.
Figure 28:
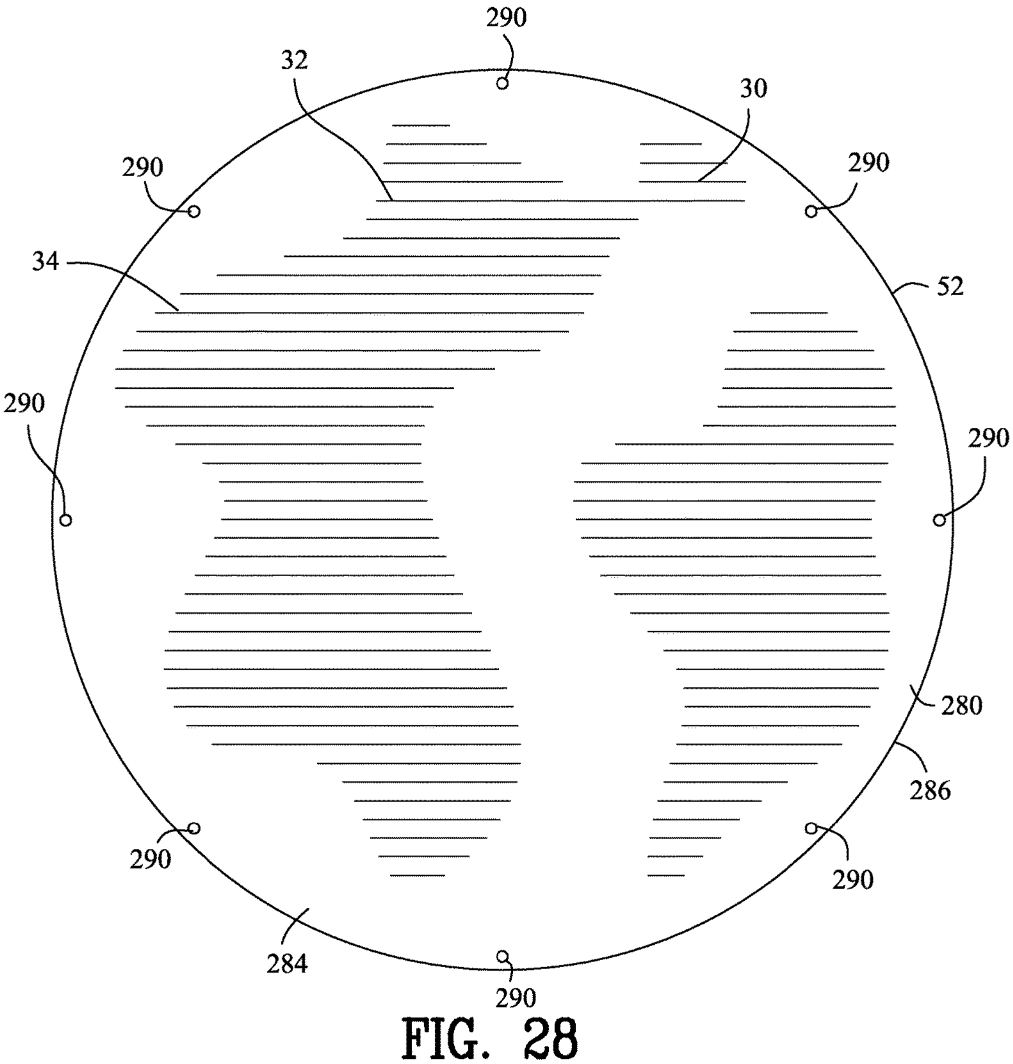
FIG. 28 is a top view of an upper board included in the second embodiment of a biodegradable serving board supporting an edible product.
Figure 29:
FIG. 29 is a side view of FIG. 28.
Figure 30:
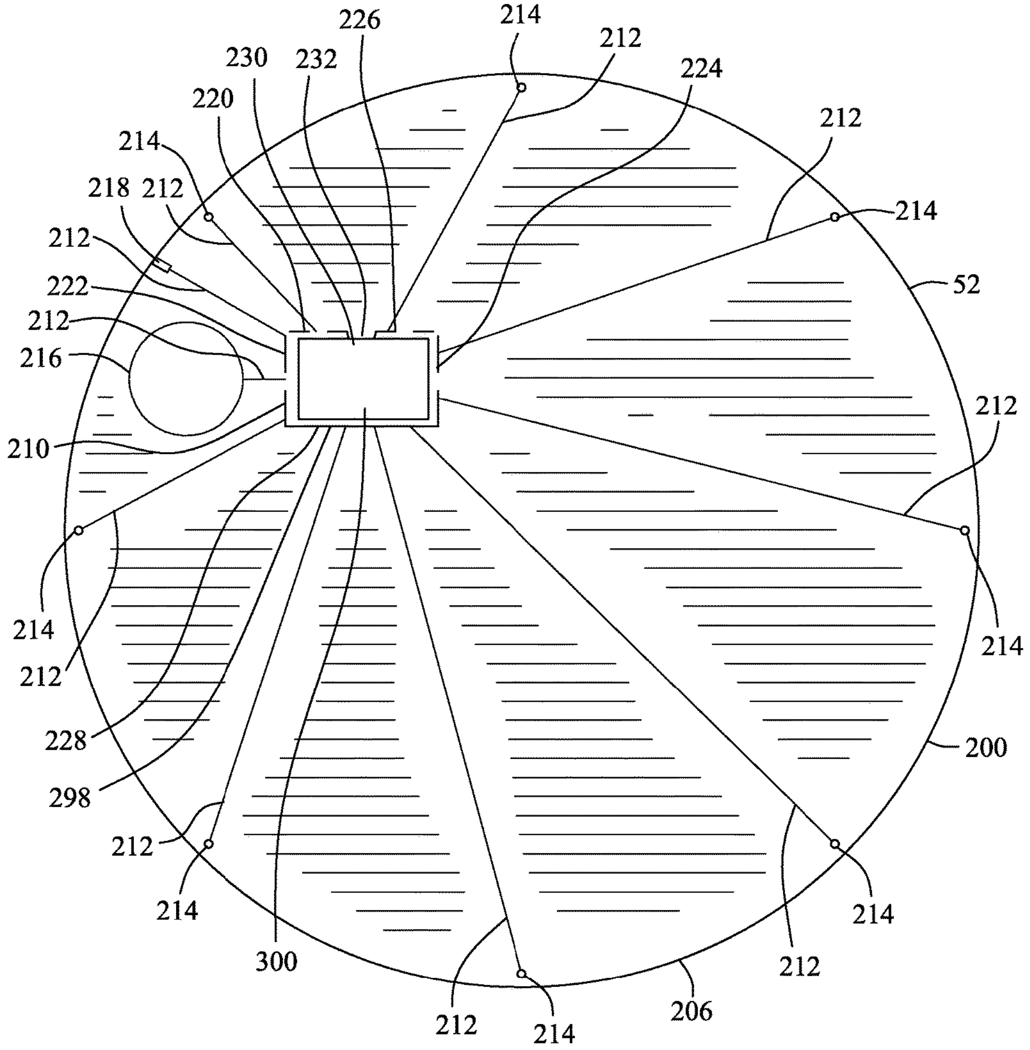
FIG. 30 is a similar view of FIG. 24 illustrating a deposable vehicle positioned above an access panel.
Figure 31:
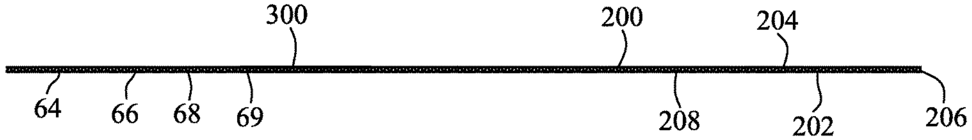
FIG. 31 is a side view of FIG. 30.

FIGS. 19-23 illustrate a biodegradable pivoting ornament 140 coupled to the upper surface 24 of the first board 20. The biodegradable pivoting ornament 140 can be position between a collapsible position 154 as shown in FIG. 21 and an extendable position 156 as shown in FIGS. 20, 22 and 23. In the collapsible position 154 the biodegradable pivoting ornament 140 defines a parallel orientation 160 with the first board 20 during storage and transportation of the serving board 10. In the expandable position 156 the biodegradable pivoting ornament 140 defines a perpendicular orientation 162 with the first board 20 during utilization of the serving board 10.

The biodegradable pivoting ornament 140 includes a disbursing body 142 including a creased portion 144. Internal to the disbursing body 142 is an ornament chamber 146. As best shown in FIGS. 21-23, the biodegradable pivoting ornament 140 further includes a first leg 150 and a second leg 152. The first leg 150 is preferably coupled to the upper surface 24 of the first board 20 by an adhesive or other coupling means. While the biodegradable pivoting ornament 140 is in the collapse position 152, the creased portion 144 permits the biodegradable pivoting ornament 142 to have a generally flat configuration. While the biodegradable pivoting ornament 140 is in the expanded position 156, the creased portion 144 permits the biodegradable pivoting ornament 142 to expand and create the ornament chamber 146 and an ornament aperture 148. The ornament aperture 148 is positioned over the light amending diode 94. Thereafter, the second leg 152 may be pivoted for positioning the second leg 152 adjacent the upper surface 24 of the first board 20. The second leg 152 may include an adhesive or other coupling means for coupling the second leg 152 to the upper surface 24 of the first board 20.

The biodegradable pivoting ornament 142 may include but not limited to figurines, symbols, models, letters, numbers, designs or other ornamental objects. The biodegradable pivoting ornament 142 covers the light emitting diode 94 for projecting the viewable light 92 into the biodegradable pivoting ornament 142. The disbursing body 142 disperses the viewable light 92 in multiple directions for illuminating the biodegradable pivoting ornament 142.

FIGS. 24-46 illustrate a second embodiment of the present invention. The serving board 10 of the second embodiment comprises a lower board 200, a middle board 240 and an upper board 280. The lower board 200 defines a lower fluted corrugated medium 208 between a lower liner board 202 and an upper liner board 204. The lower board 200 defines a lower edge 206. Preferably, the lower board 200 is constructed from a biodegradable material 64.

Figure 32:
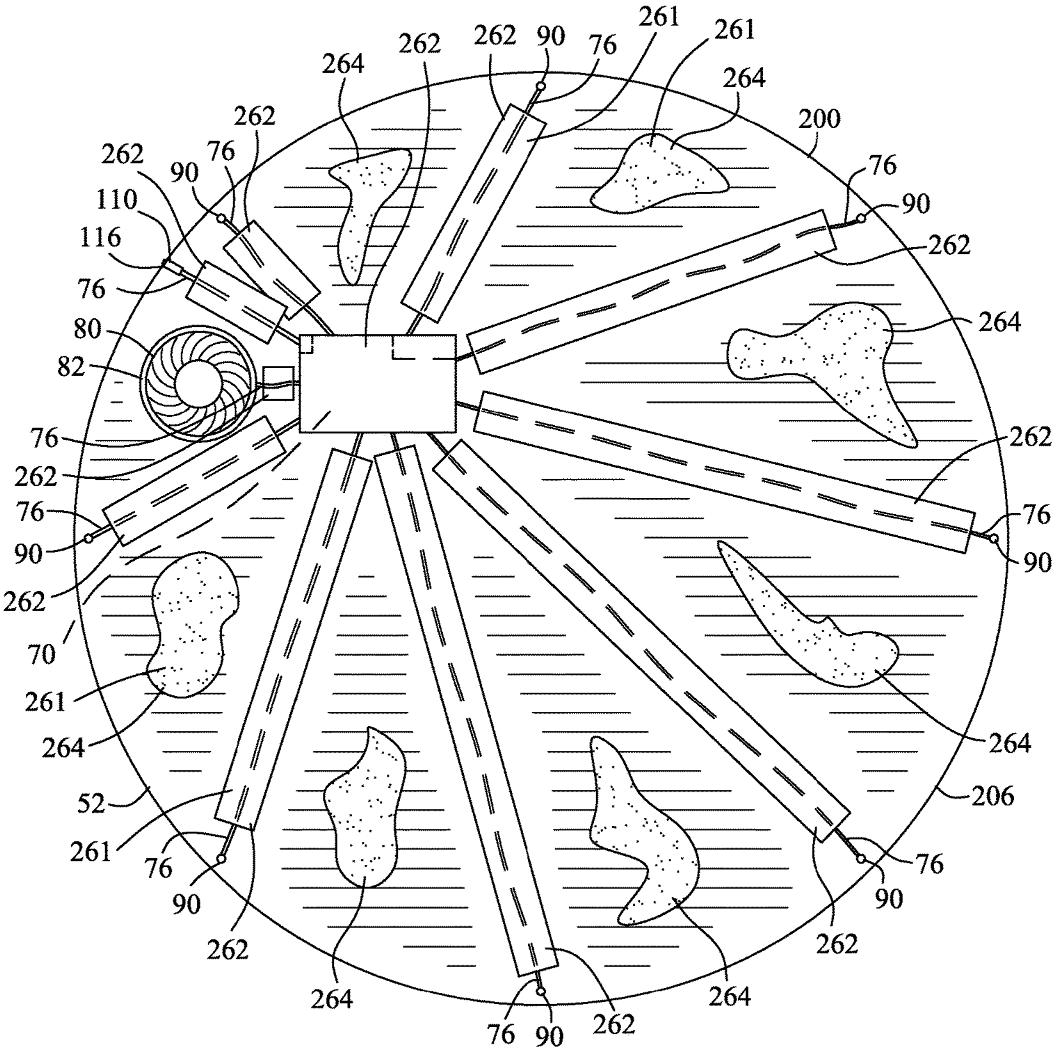
FIG. 32 is a similar view of FIG. 30 illustrating a circuit board, plurality of illuminating devices and a speaker secured to the lower board.
Figure 33:
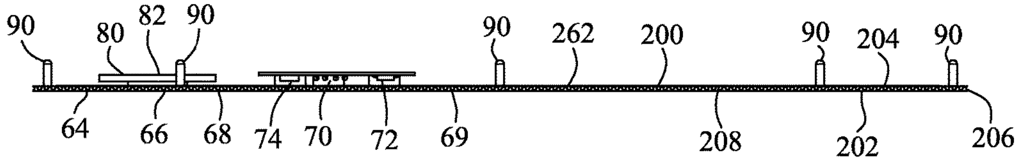
FIG. 33 is a side view of FIG. 32.

The upper liner board 204 of the lower board 200 may include a circuit board illustration 210, a conduit illustration 212, a LED illustration 214, a speaker illustration 216 and a switch illustration 218. As shown in FIGS. 32 and 33, the circuit board illustration 210, conduit illustration 212, LED illustration 214, speaker illustration 216 and switch illustration 218 assist in positioning in the integrated circuit 70, electrical conduits 76, LEDs 94, speaker 82 and actuator 110, respectively against the lower board 200.

The lower board 200 may further include an access panel 220 defined by a first perforated edge 222, a second perforated edge 224, a third perforated edge 226 and a hinge side 228. The access panel 220 may include an engagement indent 230 that mates with an extending tab 232 of the lower board 200. A finger of the user may impress and displace the extending tab 232 from the engagement indent 230 for creating a displacement aperture 234 and facilities separation of the access panel 220 from the lower board 200 about the hinge side 228. Upon removal of the access panel 220 from the lower board 200, an access aperture 236 is created in the lower board 200.

A middle board 240 defines a middle fluted corrugated medium 248 between a lower liner board 242 and an upper liner board 244. The middle board 240 defines a middle edge 246. Preferably, the middle board 240 is constructed from a biodegradable material 64.

Figure 34:
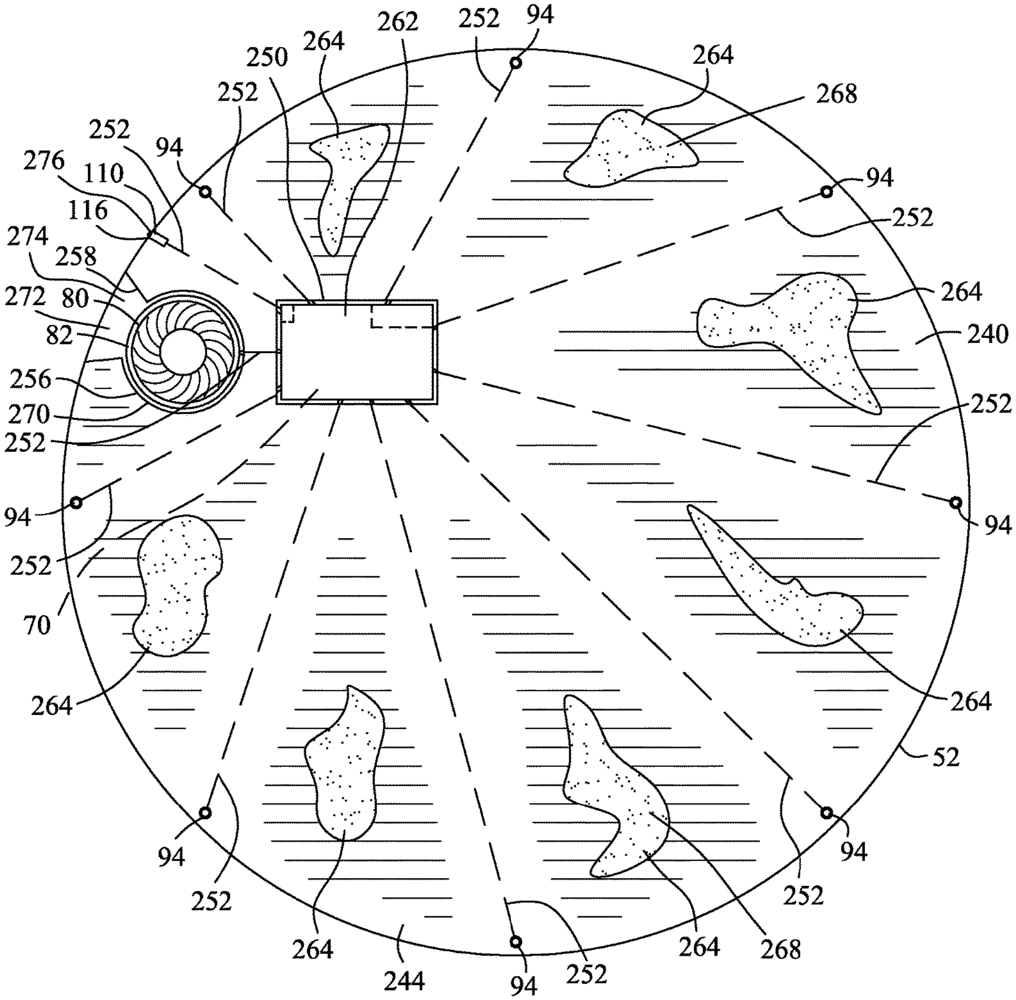
FIG. 34 is a similar view of FIG. 33 illustrating the middle board positioned over the lower board.
Figure 35:
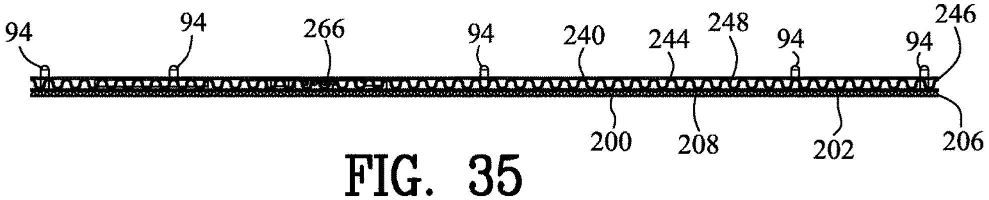
FIG. 35 is a side view of FIG. 34.
Figure 36:
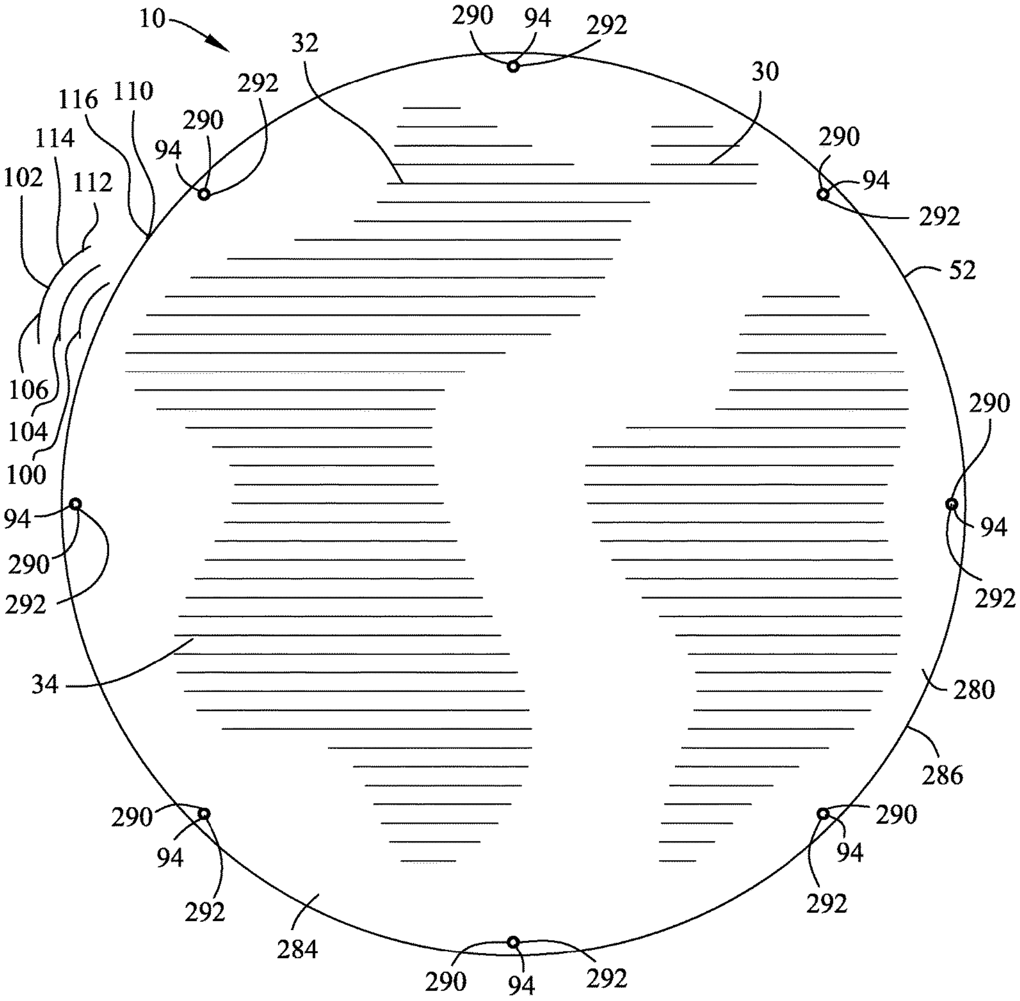
FIG. 36 is a similar view of FIG. 34 illustrating the upper board positioned over the middle board.
Figure 37:
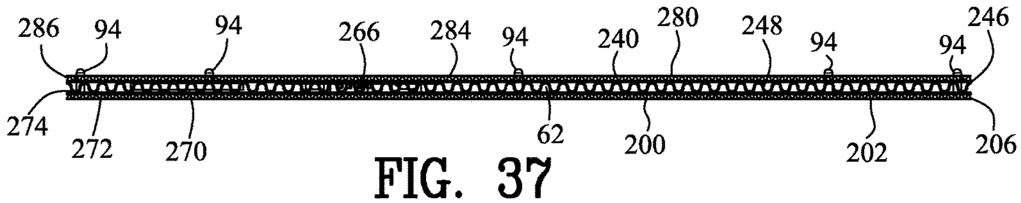
FIG. 37 is a side view of FIG. 36.
Figure 38:
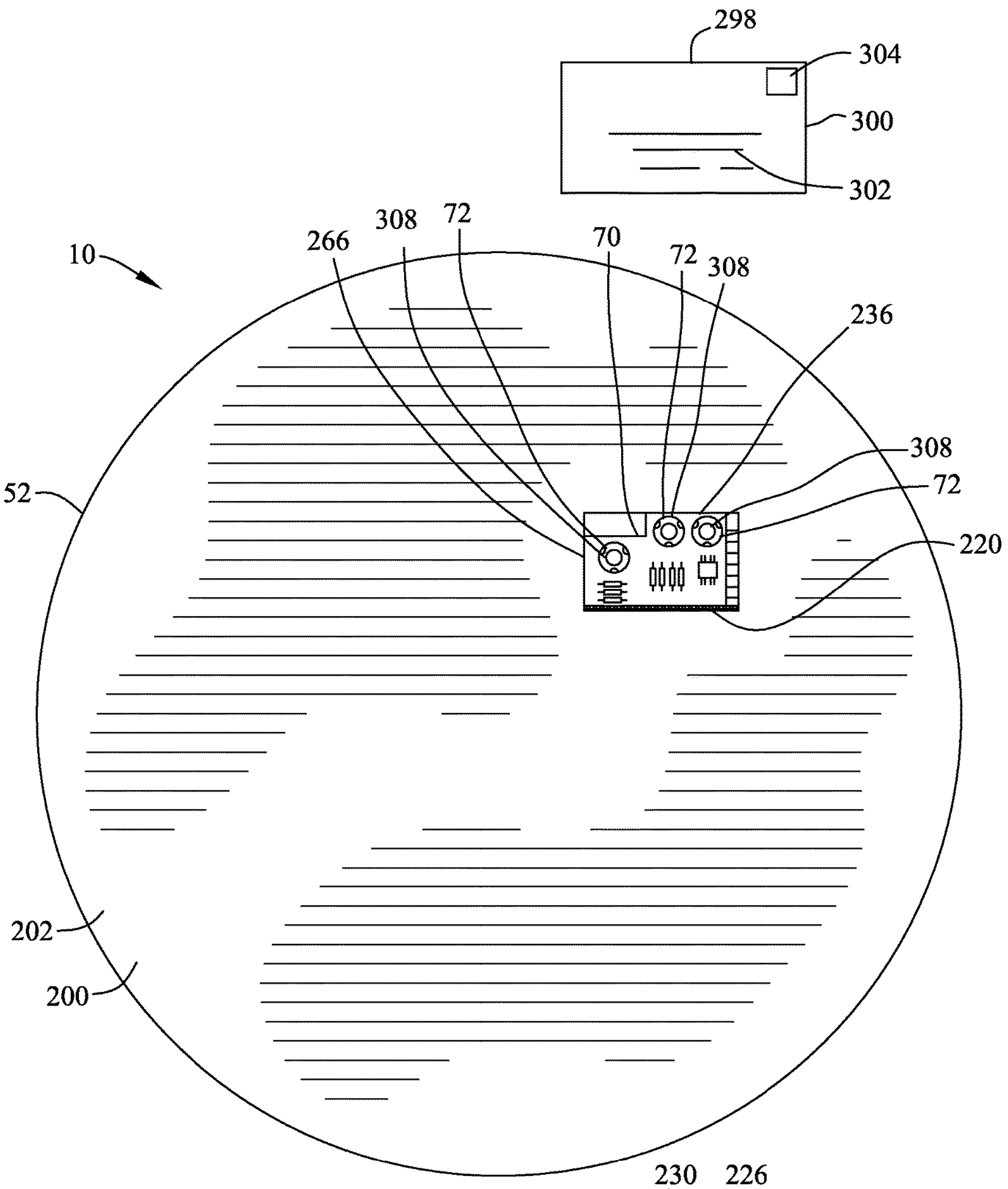
FIG. 38 is a bottom view of FIG. 36 illustrating the access panel pivoting relative to the lower board for removing a deposable vehicle and exposing a removable battery.
Figure 39:
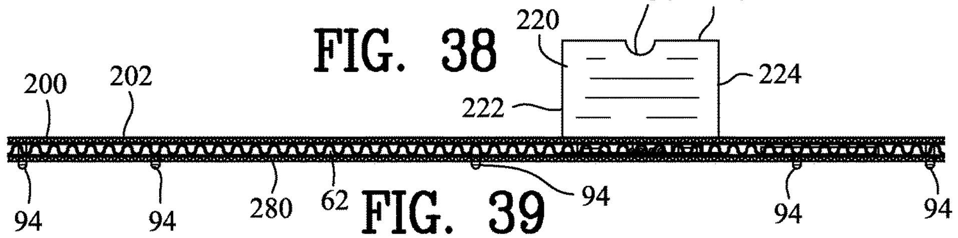
FIG. 39 is a side view of FIG. 38.
Figure 40:
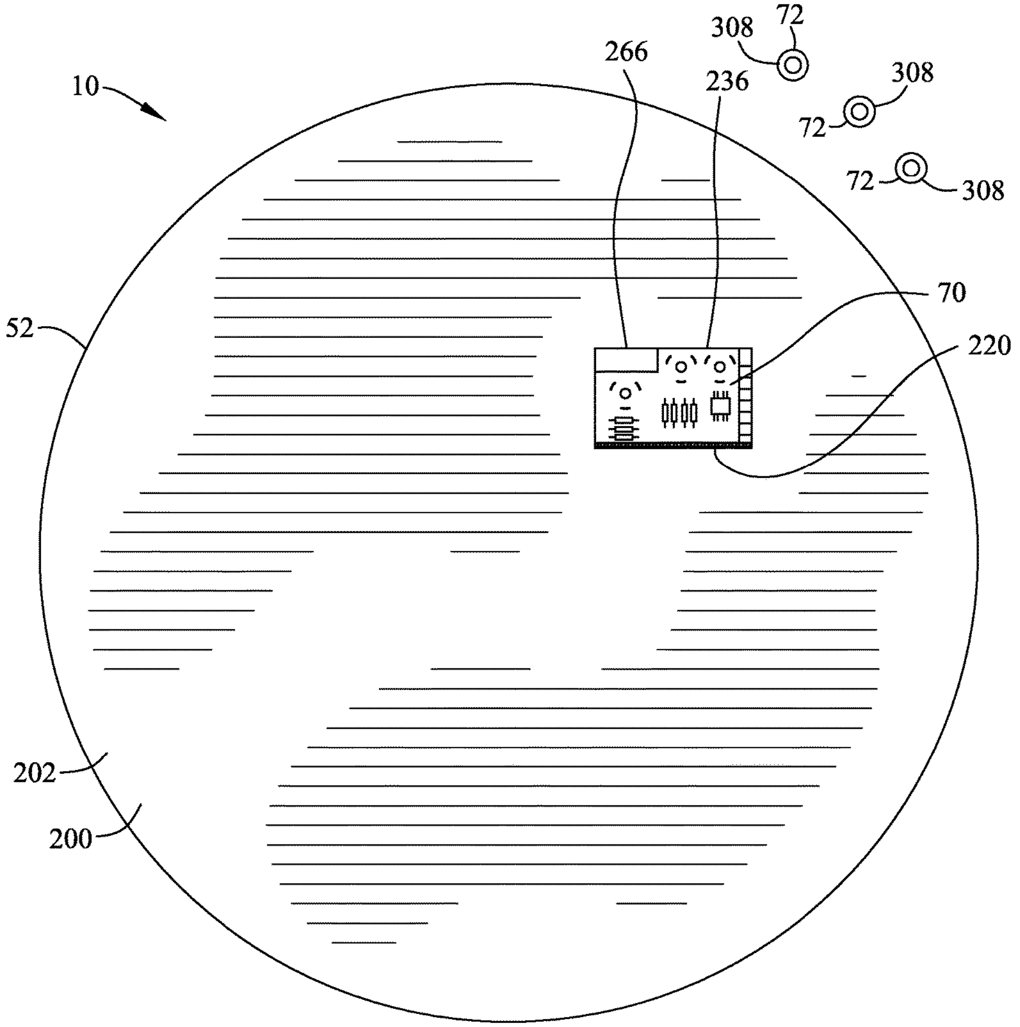
FIG. 40 is a view similar to FIG. 38 illustrating the removable battery separated from the integrated circuit.
Figure 41:
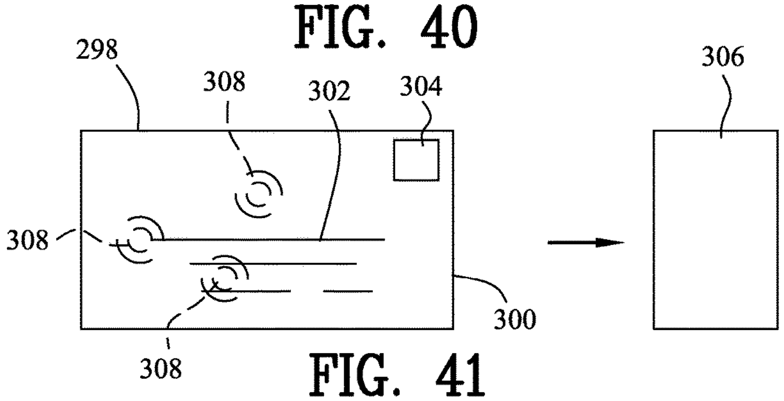
FIG. 41 illustrates the deposable vehicle of FIG. 38 including the removable battery and being forwarded to a recycle facility.

The middle board 240 may include a circuit board aperture 250, a plurality of middle lighting apertures 254, an output aperture 256, a flaring duct opening 258, and an actuator aperture 260. As shown in FIGS. 34 and 35, the circuit board aperture 250, the plurality of middle lighting apertures 254, the output aperture 256 and the actuator aperture 260 encircle the integrated circuit 70, LEDs 94, speaker 82 and actuator 110, respectively upon the lower liner board 242 of the middle board 240 engaging the upper liner board 204 of the lower board 200.

The upper board 280 defines an upper fluted corrugated medium 288 between a lower liner board 282 and an upper liner board 284. The upper board 280 defines an upper edge 286. Preferably, the upper board 280 is constructed from a biodegradable material 64.

The upper board 280 may include a plurality of upper lighting apertures 290 that align with the plurality of middle lighting apertures 254 upon the engaging between the lower liner board 282 of the upper board 280 and the upper liner board 244 of the middle board 240. The combined plurality of upper lighting apertures 290 and the plurality of middle lighting apertures 254 construct a plurality of lighting columns 202.

FIGS. 30-37 illustrate the method of constructing the serving board 10. A deposable vehicle 298 which will be discussed further below may first be positioned over the access panel 220. Thereafter, as shown in FIGS. 32 and 33, the integrated circuit 70, electrical conduits 76, LEDs 94, speaker 82 and actuator 110 are positioned above the circuit board illustration 210, conduit illustration 212, LED illustration 214, speaker illustration 216 and switch illustration 218 respectively of the lower board 200.

A first adhesive 261 including a double sided adhesive tape 262 may be utilized for both maintaining the integrated circuit 70, electrical conduits 76, LEDs 94, speaker 82 and actuator 110 against the lower board 200 and coupling the upper liner board 204 of the lower board 200 with the lower liner board 242 of the middle board 240. Alternatively, a food grade glue 264 may be utilized for both maintaining the integrated circuit 70, electrical conduits 76, LEDs 94, speaker 82 and actuator 110 against the lower board 200 and coupling the upper liner board 204 of the lower board 200 with the lower liner board 242 of the middle board 240.

The middle board 240 may further include a plurality of conduit perforated lines 252 that align with the electrical conduits 76 upon abutting the lower board 200 with the middle board 240. The plurality of electrical conduits 76 are positioned within the plurality of conduit perforated lines 252 for permitting a continuous abutment between the lower board 200 and the middle board 240 and between the middle board 240 and the upper board 280.

As shown in FIGS. 34-37, a second adhesive 268 including either a double sided adhesive tape 262 and/or a food grade glue 264 couples the upper liner board 244 of the middle board 240 with the lower liner board 282 of the upper board 280. Upon engagement of the lower board 200 and the upper board 280 with the middle board 240 a circuit board chamber 266, an output chamber 270, a speaker output chamber 272 and an actuator chamber 276 are formed. More specifically, the circuit board chamber 266 receives the integrated circuit 70, the output chamber 270 receives the speaker 82 and the actuator chamber 276 receives the actuator 110. The flaring duct opening 258 along with the lower board 200 and the upper board 280 define the speaker output chamber 272. The speaker output chamber 272 defines an acoustic transformer 274 resulting in a greater acoustic output power.

The plurality of lighting columns 292, the circuit board chamber 266, the output chamber 270, the speaker output chamber 272 and the actuator chamber 276 allow the serving board 10 to incorporate the LEDs 214, the integrated circuit 70, electrical conduits 76, LEDs 94, speaker 82 and actuator 110 while producing a flat serving board 10.

FIGS. 38-41 illustrate the method of removing the battery 74 from the serving board 10 for providing a more environmental friendly disposable serving board 10. More specifically, after the serving board 10 has been utilized, the user may pivot the access panel 220 from the lower board 200 to expose the disposable vehicle 298. The user may then remove the disposable vehicle 298 from the circuit board chamber 266. The disposable vehicle 298 may include a mailing envelope 300 having a mailing address 302 and postage 304. Once the disposable vehicle 298 is removed, the integrated circuit 70 is exposed along with the removable battery 308. The removable batteries 308 are preferably removed from the integrated circuit 70 before disposal of the serving board 10 into any trash receptacle. More specifically, the removable batteries 308 may be inserted into the mailing envelope 300 and placed in a Postal Service for shipment to a recycle facility 306.

Figure 42:
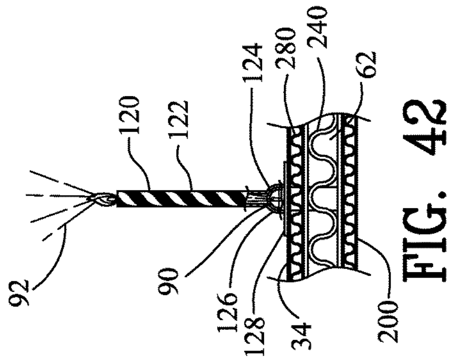
FIG. 42 is an enlarged portion of FIG. 37 including a light dispensing candle covering a illuminating device.

FIG. 42 illustrates the serving board 10 of the second embodiment engaging a light dispersing candle 120 coupled to the upper liner board 284 of the upper board 280. The light dispersing candle 120 covers the light emitting diode 94 for projecting the viewable light 92 into the light dispersing candle 120. The light dispersing candle 120 includes a disbursing body 122 and a base 124. The disbursing body 122 disperses the viewable light 92 in multiple directions for illuminating the light dispersing candle 120. The base 124 includes a bulbous portion 126 and a linear portion 128. Preferably, the bulbous portion 126 has a curvature that is identical to the curvature of the light emitting diode 94 for continuously abutting the bulbous portion 126 with the light emitting diode 94. Similarly, the linear portion 128 continuously abuts the upper liner board 284 of the upper board 280. The continuous abutment between the base 124 with the light amending diode 94 and the upper liner board 284 of the upper board 280 provides a stable and removable coupling between the light dispersing candle 120 and the serving board 10. The light dispersing candle 120 is may be constructed from a biodegradable material 64.

Alternatively, the light dispensing candle 120 may be constructed of a second edible product 170 such as convection sugar or other products that may be consumed by an individual. The second edible product 170 could be removed by an individual as an additional treat to the edible product 14. Furthermore, the disbursing body 122 of the second edible product 170 may be separated from the base 124 of the second edible product 170 by an etched fracture line 172 for more easily separating the disbursing body 122 from the base 124. The etched fracture line 172 permits a more easy separation of the disbursing body 122 from the base 124 and creating a more decorative figure to consume for the individual.

Figure 43:
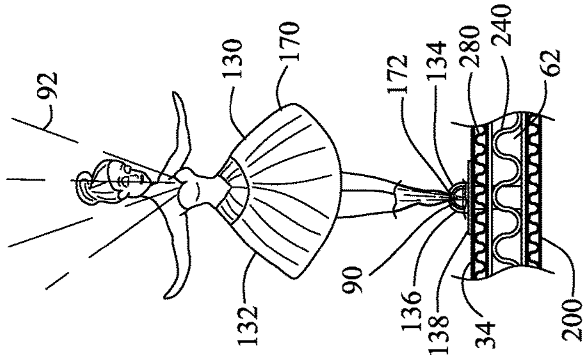
FIG. 43 is an enlarged portion of FIG. 37 including a light dispensing ornament covering a illuminating device.

FIG. 43 illustrates the serving board 10 of the second embodiment engaging the light dispersing ornament 130 coupled to the upper liner board 284 of the upper board 280. The light dispensing ornament 130 may include but not limited to figurines, symbols, models, letters, numbers, designs or other ornamental objects. The light dispersing ornament 130 covers the light emitting diode 94 for projecting the viewable light 92 into the light dispersing ornament 130. The light dispersing ornament 130 includes a disbursing body 132 and a base 134. The disbursing body 132 disperses the viewable light 92 in multiple directions for illuminating the light dispersing ornament 130. The base 134 includes a bulbous portion 136 and a linear portion 138. Preferably, the bulbous portion 136 has a curvature that is identical to the curvature of the light emitting diode 94 for continuously abutting the bulbous portion 136 with the light emitting diode 94. Similarly, the linear portion 138 continuously abuts the upper liner board 284 of the upper board 280. The continuous abutment between the base 134 with the light amending diode 94 and the upper liner board 284 of the upper board 280 provides a stable and removable coupling between the light dispersing ornament 130 and the serving board 10. The light dispersing ornament 130 is may be constructed from a biodegradable material 64.

Alternatively, the light dispersing ornament 130 may be constructed of a second edible product 170 such as convection sugar or other products that may be consumed by an individual. The second edible product 170 could be removed by an individual as an additional treat to the edible product 14. Furthermore, the disbursing body 122 of the second edible product 170 may be separated from the base 124 of the second edible product 170 by an etched fracture line 172 for more easily separating the disbursing body 122 from the base 124. The etched fracture line 172 permits a more easy separation of the disbursing body 122 from the base 124 and creating a more decorative figure to consume for the individual.

Figure 46:
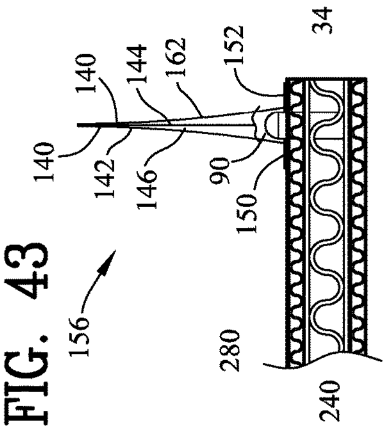
FIG. 46 is a view similar to FIG. 45 illustrating a locking leg of the biodegradable pivoting ornament coupling to the upper board for maintaining the biodegradable pivoting ornament in a perpendicular orientation relative to the upper board during utilization of the serving board.
Figure 45:
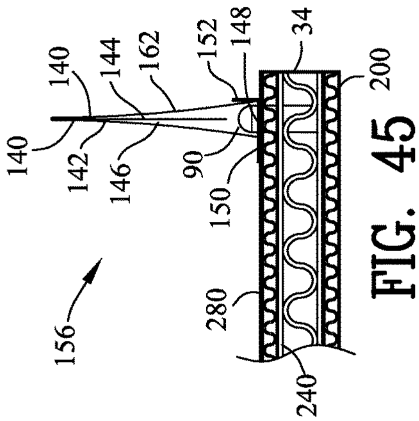
FIG. 45 is a view similar to FIG. 44 illustrating the biodegradable pivoting ornament pivoted into the expandable position over the illuminating device.
Figure 44:
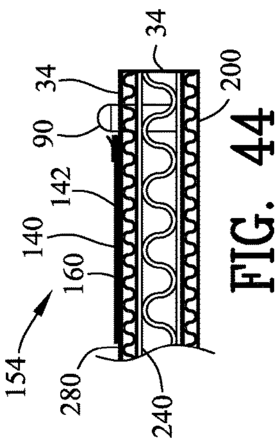
FIG. 44 is an enlarged portion of FIG. 37 including a biodegradable pivoting ornament in a collapsible position.

FIGS. 44-46 illustrate the serving board 10 of the second embodiment engaging the biodegradable pivoting ornament 140 coupled to the upper liner board 284 of the upper board 280. The biodegradable pivoting ornament 140 can be position between a collapsible position 154 as shown in FIG. 44 and an extendable position 156 as shown in FIGS. 45 and 46. In the collapsible position 154 the biodegradable pivoting ornament 140 defines a parallel orientation 160 with the upper board 280 during storage and transportation of the serving board 10. In the expandable position 156 the biodegradable pivoting ornament 140 defines a perpendicular orientation 162 with the upper board 280 during utilization of the serving board 10.

The biodegradable pivoting ornament 140 includes a disbursing body 142 including a creased portion 144. Internal to the disbursing body 142 is an ornament chamber 146. As best shown in FIGS. 44-46, the biodegradable pivoting ornament 140 further includes a first leg 150 and a second leg 152. The first leg 150 is preferably coupled to the upper liner board 284 of the upper board 280 by an adhesive or other coupling means. While the biodegradable pivoting ornament 140 is in the collapse position 152, the creased portion 144 permits the biodegradable pivoting ornament 142 to have a generally flat configuration. While the biodegradable pivoting ornament 140 is in the expanded position 156, the creased portion 144 permits the biodegradable pivoting ornament 142 to expand and create the ornament chamber 146 and an ornament aperture 148. The ornament aperture 148 is positioned over the light amending diode 94. Thereafter, the second leg 152 may be pivoted for positioning the second leg 152 adjacent the upper liner board 284 of the upper board 280. The second leg 152 may include an adhesive or other coupling means for coupling the second leg 152 to the upper liner board 284 of the upper board 280.

The biodegradable pivoting ornament 142 may include but not limited to figurines, symbols, models, letters, numbers, designs or other ornamental objects. The biodegradable pivoting ornament 142 covers the light emitting diode 94 for projecting the viewable light 92 into the biodegradable pivoting ornament 142. The disbursing body 142 disperses the viewable light 92 in multiple directions for illuminating the biodegradable pivoting ornament 142.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A serving board for supporting an edible product, comprising;

a first board defining a lower surface, an upper surface and a first edge;

a second board defining a lower surface, an upper surface and a second edge;

a spacing layer extending between said lower surface of said first board and said upper surface of said second board;

said spacing layer distancing said first board from said second board for defining a chamber;

an integrated circuit positioning in said chamber;

an electrical power source positioning in said chamber and electrically coupled to said integrated circuit;

an output device electrically coupled to said integrated circuit for producing a sensatory output;

said first board, said second board and said spacing layer constructed from a paper pulp based material; and said output device includes an illuminating device and said sensatory output includes a viewable light.

2. A serving board for supporting an edible product as set forth in claim 1, wherein said output device includes a speaker and said sensatory output includes an audible sound.

3. A serving board for supporting an edible product as set forth in claim 2, wherein said audible sound includes a prerecorded musical composition saved within said integrated circuit.

4. A serving board for supporting an edible product as set forth in claim 2, wherein said audible sound includes a prerecorded message saved within said integrated circuit.

5. A serving board for supporting an edible product as set forth in claim 2, further including an actuator electrically coupled to said integrated circuit;

said actuator engaged for recording and saving a personal message within said integrated circuit; and said personal message defining said audible sound upon engaging said actuator.

6. A serving board for supporting an edible product as set forth in claim 1, wherein said illuminating device includes a plurality of light emitting diodes secured to said first board and projecting said viewable light in a generally ascending and vertical orientation above said upper surface of said first board.

7. A serving board for supporting an edible product as set forth in claim 1, further including a light dispersing candle coupled to said upper surface of said first board; and said light dispersing candle covering said light emitting diode for projecting said viewable light into said light dispersing candle.

8. A serving board for supporting an edible product as set forth in claim 7, wherein said light dispersing candle is constructed from a paper pulp based material.

9. A serving board for supporting an edible product as set forth in claim 7, wherein said light dispersing candle is constructed from a second edible product.

10. A serving board for supporting an edible product as set forth in claim 1, further including a light dispersing ornament coupled to said upper surface of said first board; and said light dispersing ornament covering said light emitting diode for projecting said viewable light into said light dispersing ornament.

11. A serving board for supporting an edible product as set forth in claim 10, wherein said light dispersing ornament is constructed from a paper pulp based material.

12. A serving board for supporting an edible product as set forth in claim 10, wherein said light dispersing ornament is constructed from a second edible product.

13. A serving board for supporting an edible product as set forth in claim 1, further including a paper pulp based pivoting ornament coupled to said upper surface of said first board;

said paper pulp based pivoting ornament position between a collapsible position and an extendable position;

said collapsible position defining a parallel orientation with said first board during storage and transportation of the serving board;

said expandable position defining a perpendicular orientation with said first board during utilization of the serving board; and said paper pulp based pivoting ornament covering said light emitting diode for projecting said viewable light into said paper pulp based pivoting ornament.

14. A serving board for supporting an edible product as set forth in claim 1, wherein said upper surface of said first board includes a decorative color.

15. A serving board for supporting an edible product as set forth in claim 1, wherein said upper surface of said first board includes a decorative pattern.

16. A serving board for supporting an edible product as set forth in claim 1, further including a wax layer covering said upper surface of said first board for sealing the edible product from said first board.

17. A serving board for supporting an edible product, comprising:

a lower board defining a lower fluted corrugated medium between a lower liner board and an upper liner board;

said lower board defines a lower edge;

an upper board defining an upper fluted corrugated medium between a lower liner board and an upper liner board;

said upper board defines an upper edge;

a middle board defining a middle fluted corrugated medium between a lower liner board and an upper liner board;

said middle board defines a middle edge;

a first adhesive coupling said upper liner board of said lower board with said lower liner board of said middle board;

a second adhesive coupling said upper liner board of said middle board with said lower liner board of said upper board;

a circuit aperture in said middle board for defining a circuit board chamber between said lower board and said upper board;

an integrated circuit positioned within said circuit board chamber;

an output device electrically coupled to said integrated circuit for producing a sensatory output; and said lower liner board, said upper liner board and said middle fluted corrugated medium constructed from a paper pulp based material.

18. A serving board for supporting an edible product as set forth in claim 17, further including an output aperture in said middle board for defining an output chamber between said lower board and said upper board;

said output device including a speaker positioned within said output chamber; and said sensatory output including an audible sound from said speaker.

19. A serving board for supporting an edible product as set forth in claim 18, further including a flaring duct opening in said middle board extending from said output aperture to said first edge and said second edge and between said lower board and said upper board for defining a speaker output chamber; and said speaker output chamber defining an acoustic transformer resulting in a greater acoustic output power.

20. A serving board for supporting an edible product as set forth in claim 17, further including an actuator aperture in said middle board for defining an actuator chamber between said lower board and said upper board;

an actuator positioned within said actuator chamber and electrically coupled to said integrated circuit; and said actuator engaged for activating said output device.

21. A serving board for supporting an edible product as set forth in claim 17, further including an electrical power source positioning in said circuit board chamber and electrically coupled to said integrated circuit; and an access panel in said lower board and positioned below said circuit board chamber for removing said electrical power source from said circuit board chamber.

22. A serving board for supporting an edible product as set forth in claim 21, further including a deposable vehicle positioned in said circuit board chamber and between said integrated circuit and said access panel;

said electrical power source including a removable battery; and said removable battery withdrawn from said circuit board chamber and positioned within said deposable vehicle for deposing said removable battery.

23. A serving board for supporting an edible product as set forth in claim 17, further including a plurality of middle lighting apertures in said middle board;

a plurality of upper lighting apertures in said upper board;

said plurality of middle lighting apertures aligning with said plurality of upper lighting apertures for defining a plurality of lighting columns extending within said middle board and said upper board;

said output device includes a plurality of illuminating devices and said sensatory output includes a viewable light; and said plurality of illuminating devices positioned within said plurality of lighting columns.

24. A serving board for supporting an edible product as set forth in claim 23, further including a plurality of electrical conduits coupling said integrate circuit and said plurality of illuminating devices;

a plurality of conduit perforated lines in said middle board; and said plurality of electrical conduits aligning with said plurality of conduits perforated lines for permitting a continuous abutment between said lower board and said middle board and between said middle board and said upper board.

* * * * *